US012329697B1

(12) United States Patent
Navadiya

(10) Patent No.: US 12,329,697 B1
(45) Date of Patent: Jun. 17, 2025

(54) TRANSPORT WHEELCHAIR WITH IV POLE LOCK

(71) Applicant: Broda Enterprises Inc., Kitchener (CA)

(72) Inventor: Milanbhai Navadiya, Kitchener (CA)

(73) Assignee: Broda Enterprises Inc., Kitchener (CA)

( * ) Notice: Subject to any disclaimer, the term of this patent is extended or adjusted under 35 U.S.C. 154(b) by 0 days.

(21) Appl. No.: 18/746,919

(22) Filed: Jun. 18, 2024

Related U.S. Application Data

(60) Provisional application No. 63/610,114, filed on Dec. 14, 2023.

(51) Int. Cl.
*A61G 5/10* (2006.01)

(52) U.S. Cl.
CPC .................................... *A61G 5/10* (2013.01)

(58) Field of Classification Search
CPC ........................................................ A61G 5/10
See application file for complete search history.

(56) References Cited

U.S. PATENT DOCUMENTS

| | | | | |
|---|---|---|---|---|
| 737,555 | A | 8/1903 | Dom | |
| 1,485,880 | A | 3/1924 | Palmer | |
| 1,633,473 | A | 6/1927 | Bush | |
| 2,822,103 | A | 2/1958 | Moeller | |
| 4,155,590 | A | 5/1979 | Cunningham | |
| 4,515,385 | A | 5/1985 | Christian | |
| 4,949,408 | A * | 8/1990 | Trkla | A61G 5/128 4/480 |
| 5,215,352 | A | 6/1993 | Yeh et al. | |
| 5,228,711 | A * | 7/1993 | Summers | A61G 5/1094 297/161 |

(Continued)

FOREIGN PATENT DOCUMENTS

| | | |
|---|---|---|
| CN | 115030946 | 9/2022 |
| DE | 202004000012 | 6/2004 |

(Continued)

OTHER PUBLICATIONS

Build my Wheelchair, https://buildmywheelchair.com/extreme-x8-4wd/, accessed Aug. 15, 2024, 12 pages.

(Continued)

*Primary Examiner* — Bryan A Evans
(74) *Attorney, Agent, or Firm* — Thorpe North & Western, LLP

(57) ABSTRACT

A transport wheelchair comprises a frame with a chair base movably carried by a wheel base displaceable on a set of wheels. A seat, a backrest and a legrest are carried by the chair base of the frame. An intravenous (IV) pole attachment is carried by the frame and to receive and carry an IV pole. An IV pole lock is associated with IV pole attachment. The IV pole lock comprises a plug slidably received in a tube of the IV pole. The plug is bifurcated at an inclined angle with respect to a longitudinal axis with opposing inclined surface abutting to one another. A rod extends through the plug. A cam lever is coupled to proximal end of the rod. The cam lever is pivotal to selectively position a cam against the frame to selectively draw and release the rod to selectively displace and release the bifurcated plug laterally.

20 Claims, 26 Drawing Sheets

(56) References Cited

U.S. PATENT DOCUMENTS

| | | | |
|---|---|---|---|
| 5,251,494 A | 10/1993 | Edwards | |
| 5,522,644 A | 6/1996 | Peek | |
| 5,667,230 A | 9/1997 | Riley et al. | |
| 5,868,461 A | 2/1999 | Brotherston | |
| 6,045,109 A | 4/2000 | Mashburn et al. | |
| 6,089,593 A | 7/2000 | Hanson et al. | |
| 6,231,016 B1 * | 5/2001 | Slone .................. | A61M 5/1414 248/200.1 |
| 6,386,614 B1 | 5/2002 | Logan | |
| 6,431,650 B1 | 8/2002 | Visone | |
| 6,726,279 B1 | 4/2004 | Figel et al. | |
| 6,772,460 B2 | 8/2004 | Heimbrock et al. | |
| 6,910,543 B2 | 6/2005 | Kanno et al. | |
| 7,802,768 B2 * | 9/2010 | Carnevali .............. | F16M 11/14 403/109.5 |
| 7,819,415 B2 | 10/2010 | Kio et al. | |
| 8,020,828 B2 | 9/2011 | Camevali | |
| D653,591 S | 2/2012 | Horvath et al. | |
| 8,398,108 B2 | 3/2013 | Andrews | |
| 8,550,013 B2 | 10/2013 | Carnevali | |
| 8,662,536 B2 | 3/2014 | Moreno Vallejo et al. | |
| 9,084,708 B2 | 7/2015 | Horvath et al. | |
| 9,644,425 B2 | 5/2017 | Gordon | |
| 11,389,351 B2 | 7/2022 | Couture et al. | |
| 2004/0051279 A1 | 3/2004 | Grant et al. | |
| 2006/0208552 A1 | 9/2006 | Nishiwaki | |
| 2009/0315376 A1 | 12/2009 | Nishiwaki | |
| 2022/0349515 A1 * | 11/2022 | Kataoka .............. | A61M 5/1415 |

FOREIGN PATENT DOCUMENTS

| | | |
|---|---|---|
| EP | 1413278 | 4/2004 |
| JP | 2005030487 | 2/2005 |
| KR | 200442391 | 11/2008 |
| WO | WO2023223028 | 11/2003 |

OTHER PUBLICATIONS

Broda, https://brodaseating.com/product/synthesis-positioning-wheelchair, accessed Aug. 15, 2024, 4 pages.

Park Tools, Stem Removal & Installation: Quill Stems, Date: Jan. 30, 2019, https://www.parktool.com/en-us/blog/repair-help/stem-removal-installation-quill-stems, retrieved Sep. 6, 2024; (Year: 2019), 8 pages.

* cited by examiner

TRANSPORT WHEELCHAIR WITH IV POLE LOCK

PRIORITY CLAIM AND RELATED APPLICATIONS

Priority is claimed to US Provisional Patent Application No. 63/610,114, filed Dec. 14, 2023, which is hereby incorporated herein by reference.

This is related to U.S. patent application Ser. No. 18/746,887, filed Jun. 18, 2024, entitled "Transport Wheelchair for Non-Emergency Medical Transportation", which is hereby incorporated herein by reference.

This is related to U.S. patent application Ser. No. 18/746,896, filed Jun. 18, 2024, entitled "Transport Wheelchair with Pivot Assist", which is hereby incorporated herein by reference.

This is related to U.S. patent application Ser. No. 18/746,909, filed Jun. 18, 2024, entitled "Transport Wheelchair with Armrest Lock", which is hereby incorporated herein by reference.

BACKGROUND

Transportation of passengers with limited mobility can be difficult for non-emergency medical transportation (NEMT) providers. Typically, a gurney or stretcher is used. A gurney can require two operators, can take up a significant amount of space, and can require larger vehicles. Wheelchairs can also sometimes be used instead of a gurney for NEMT but can be equally challenging and often requires the use of peripheral equipment and multiple assistants to physically manipulate the patient to reorient them in preparation for the transfer (e.g., overhead or crane lift, assisted standing transfer, assisted seated lateral transfer, etc.).

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
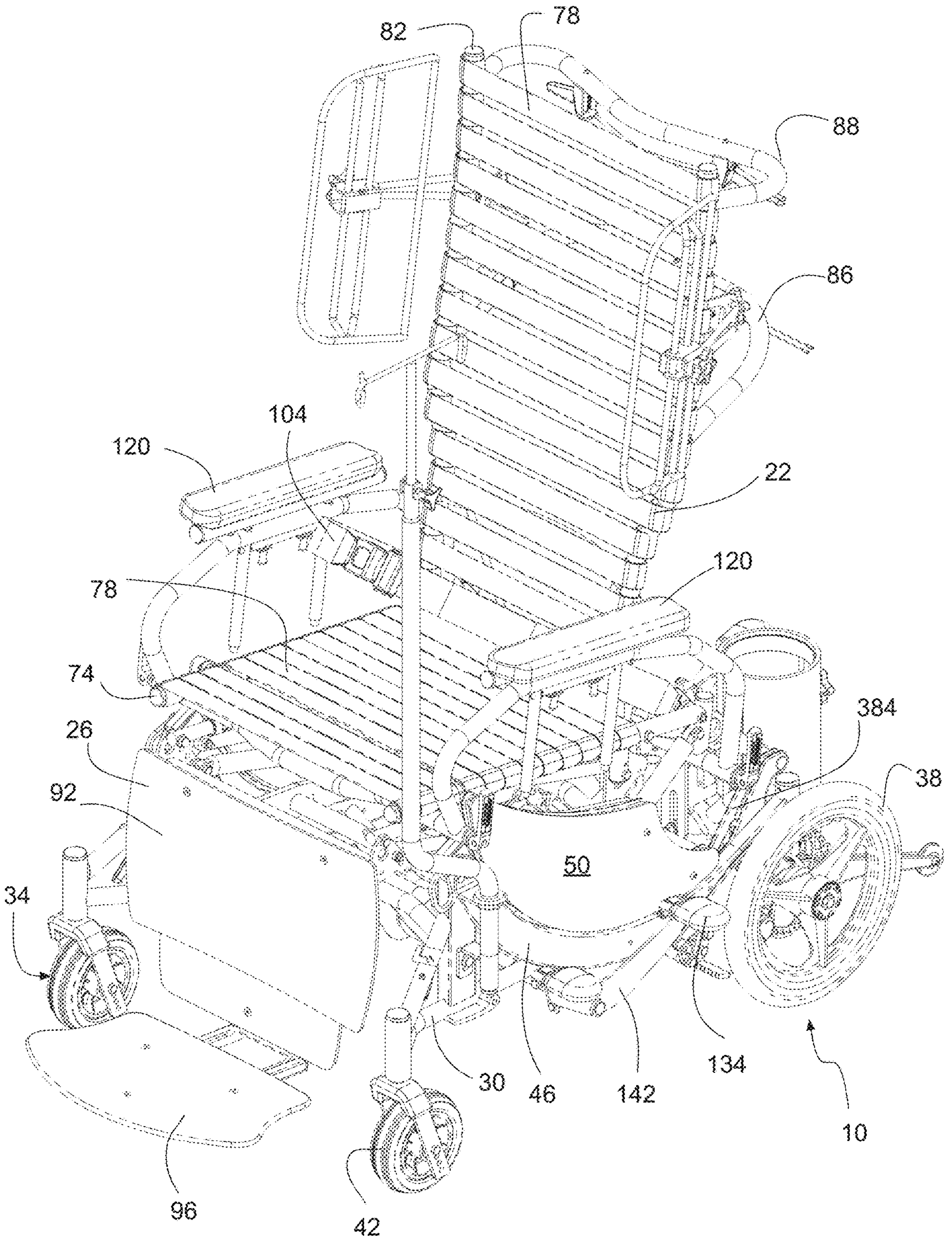
FIG. 1 is a front perspective view of an example of a transport wheelchair in accordance with some embodiments, shown in a chair configuration and a lowered position.

In the Figures, cushions have been removed from the seat, the backrest and the legrest for visibility. Similarly, in the Figures, covers have been removed from the armrests and shoulder bolsters for visibility.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

Described herein are examples of system and methods for providing non-emergency medical transportation (NEMT) of a patient and an NEMT focused transport wheelchair for commercial transport of the patient. The patient can be non-ambulatory. The transport wheelchair can be safely used by a single operator or driver to transport the patient. The transport wheelchair can be manually operated without power, such as without an electric motor or battery. Thus, the transport wheelchair can be lighter and utilized without reliance upon a power source. The transport wheelchair can reduce injury risk during transfers, loading and unloading of the patient. The transport wheelchair can be American National Standards Institute (ANSI)/Rehabilitation Engineering and Assistive Technology Society of North America (RESNA) volume 4, section 19 (WC19) wheelchair transportation standard compliant. The WC19 standard establishes design and performance requirement for wheelchairs related to their use as seats in motor vehicles.

The wheelchair can have an elevated seating surface with full recline for lateral transfer of the patient between beds, chairs or furniture. In one aspect, the seating surface can raise and lower from 22.5 inches to 32 inches (57 to 81 cm). In another aspect, the wheelchair can provide full recline into lay-flat for safe and efficient lateral transfers. In addition, the wheelchair can have a 20-degree adjustable tilt for comfort and improved patient retention (i.e., fall mitigation). In addition, the wheelchair can pivot 90 degrees horizontally and can slide laterally for maximum maneuverability in tight spaces, such as vans. Furthermore, the seat, or the armrests thereof, can be adjusted in lateral width between 20 to 24 inches (50 to 63 cm).

Referring to FIGS. 1-14, a transport wheelchair 10 is shown by way of example for non-emergency medical transportation (NEMT) of a passenger or patient. In one aspect, the transport wheelchair 10 can transfer the patient between a bed, a chair or other furniture, such as in a care facility. In another aspect, the transport wheelchair 10 can transfer the patient from a bed, a chair or other furniture to a vehicle (indicated schematically at 14 in FIG. 6), and back again. Thus, the transport wheelchair 10 can be used to transport the patient as a passenger in the vehicle, such as to a medical facility. The transport wheelchair 10 can be used both within the care facility, and the vehicle. Thus, the transport wheelchair 10 can be used for NEMT in the vehicle, and can replace the use of a separate gurney or stretcher for NEMT in the vehicle. The transport wheelchair 10 can be safely used by a single operator or driver to transport the patient. In addition, the transport wheelchair can be manually operated by the operator or driver without power, such as without an electric motor or battery.

The transport wheelchair 10 can have a seat 18, a backrest 22 and a legrest 26 carried by a frame 30. The frame 30 can have and can be displaceable on a set of wheels 34. The set of wheels 34 can comprise a pair of rear fixed wheels 38 that can rotate about a horizontal axis and one or more horizontal axles that extend laterally, but which may not pivot about a vertical axis. Thus, the horizontal axis can be a laterally-oriented axis about which the rear fixed wheels 38 can rotate around in order to roll longitudinally. The set of wheels 34 can further comprise a pair of front pivot wheels 42 or casters that can both rotate about horizontal axes/axles and pivot about vertical axes. The rear fixed wheels 38 can be positioned at a rear of the wheel base 46, while the front pivot wheels 42 or casters can be positioned at a front of the wheel base 46. The wheels 38 and 42 can be located at the lateral sides of the frame 30 and the wheelchair 10. The wheelchair 10 can have a width less than approximately 27 and ⅝ inches (69.9 cm) to fit on ramps and in isles of the vehicle 14. In another aspect, the rear wheels 38 can be larger, such as 13 inches (33 cm) in diameter, than the front wheels 42. In another aspect, the wheelchair can have paired directionally controlled locking swivel casters on the rear.

Figure 2:
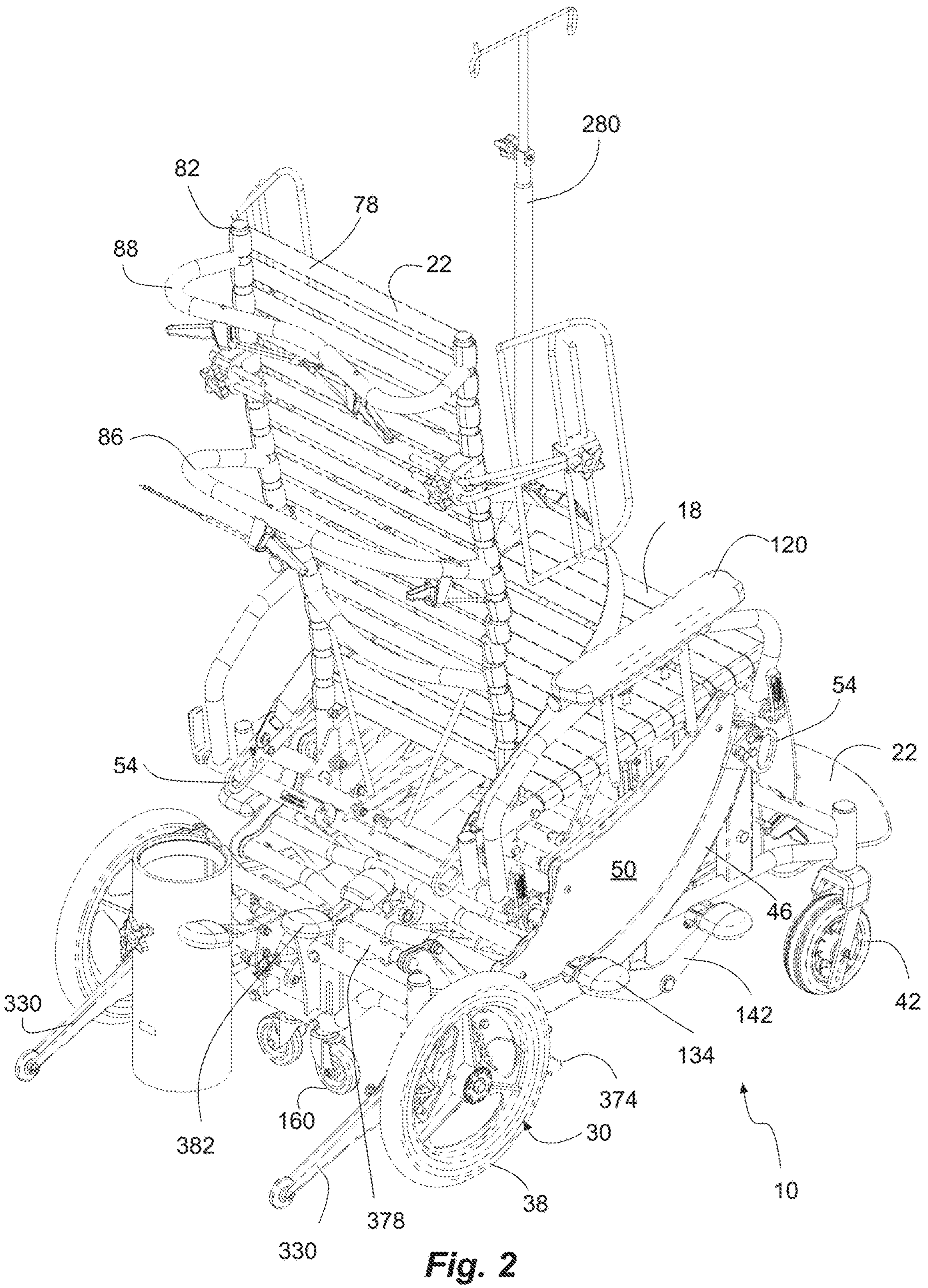
FIG. 2 is a rear perspective view of the transport wheelchair of FIG. 1.
Figure 4:
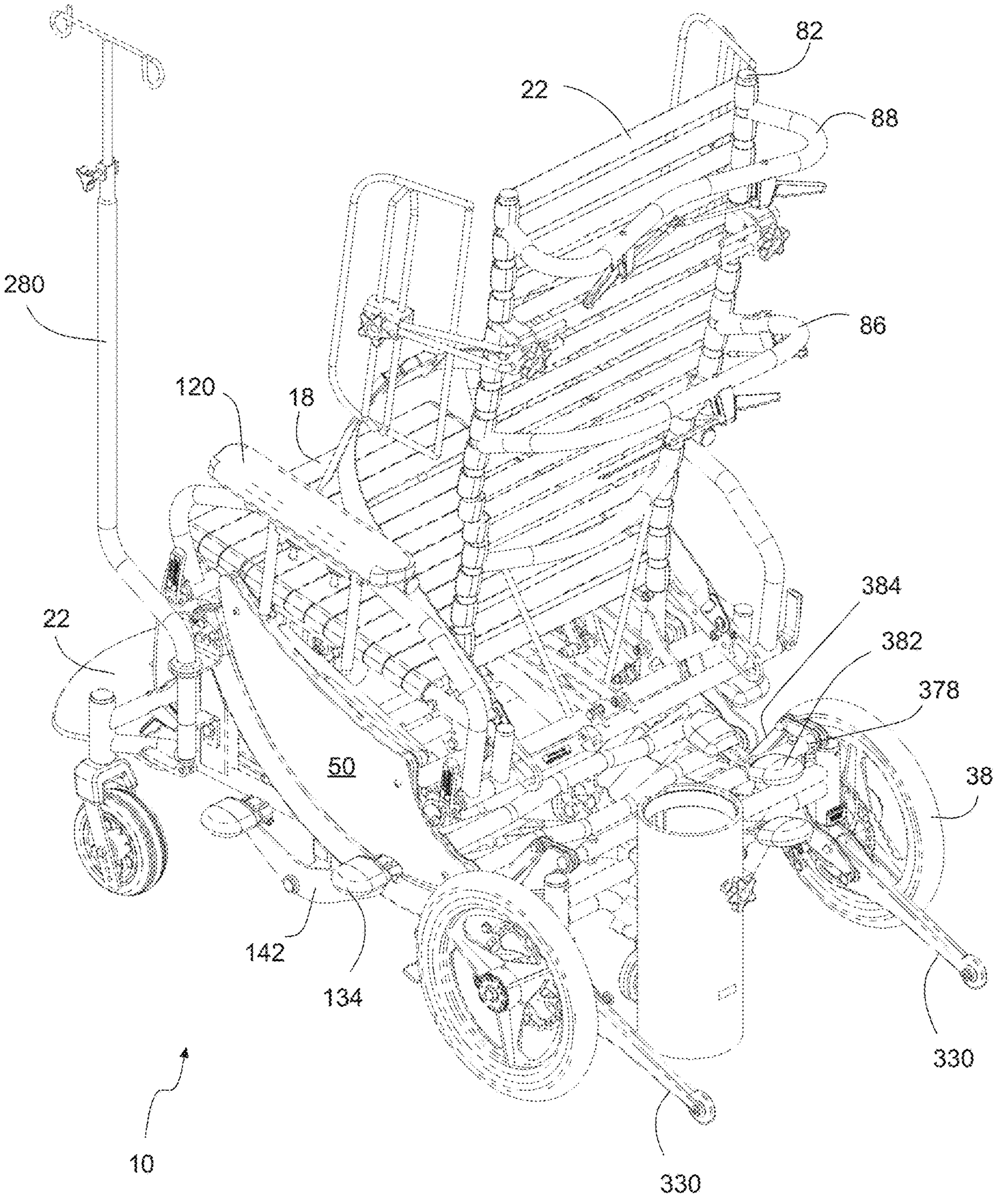
FIG. 4 is a rear perspective view of the transport wheelchair of FIG. 1.
Figure 5:
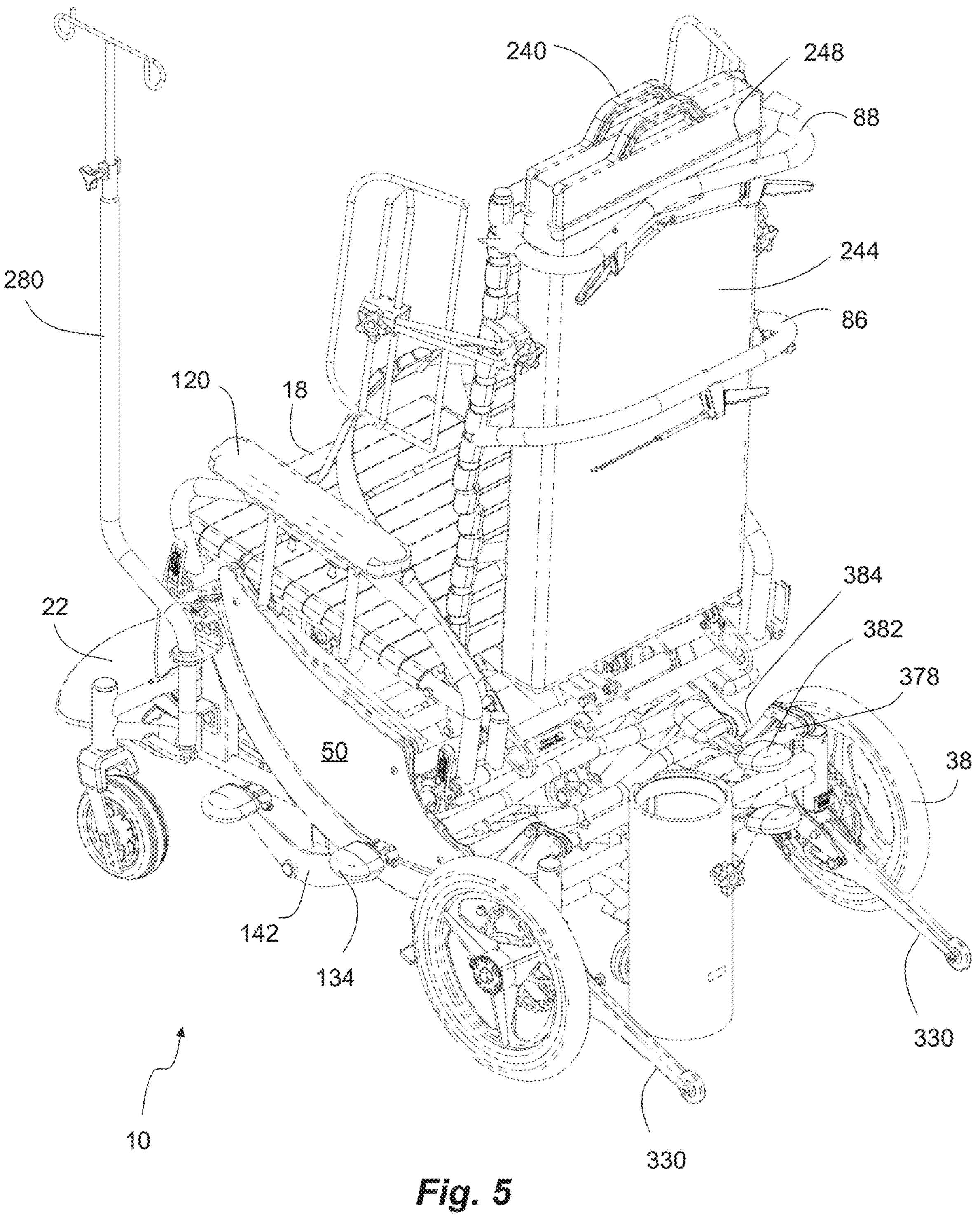
FIG. 5 is a rear perspective view of the transport wheelchair of FIG. 1, shown with a transfer board stowable thereon in accordance with some embodiments.
Figure 6:
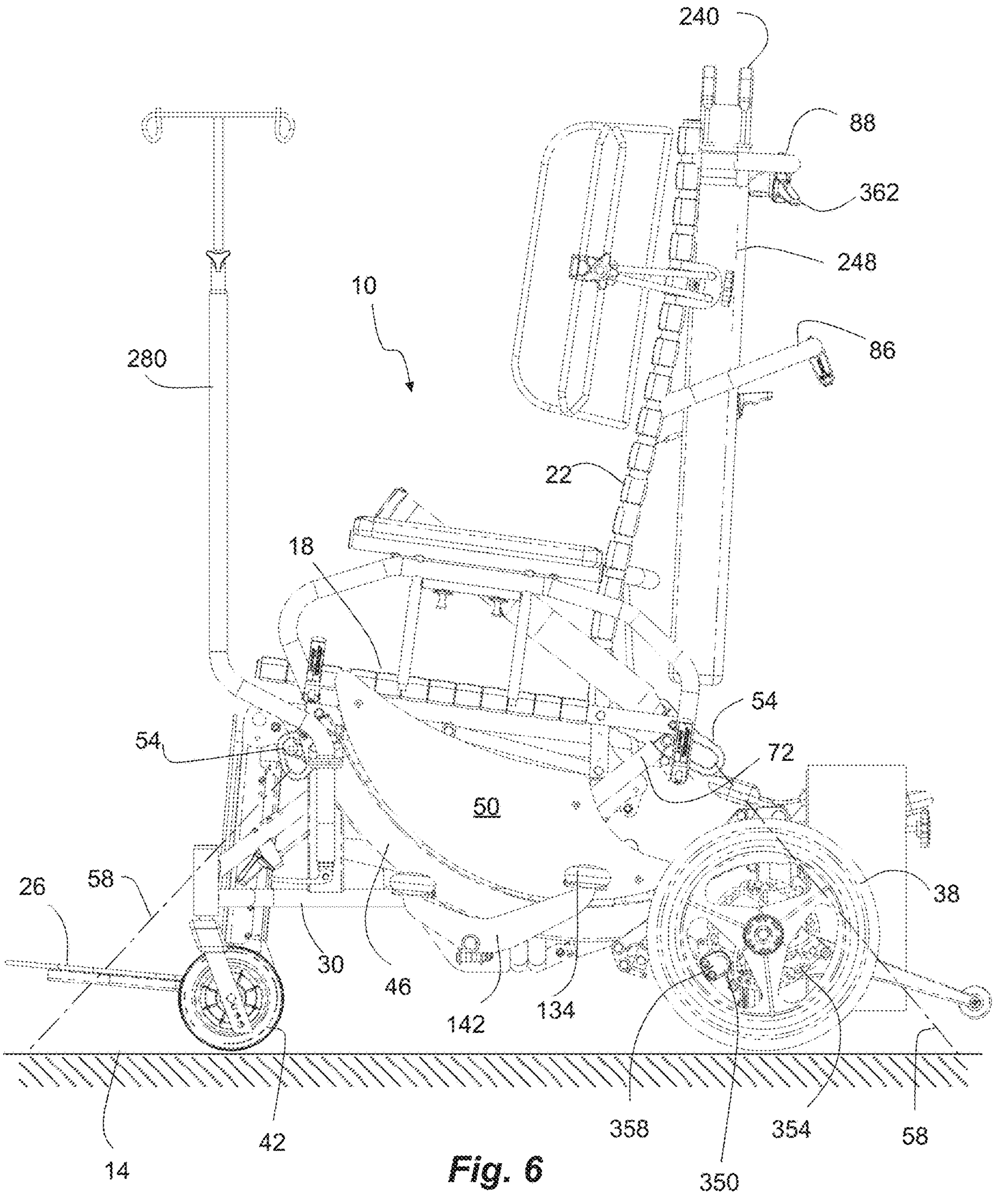
FIG. 6 is a side view of the transport wheelchair of FIG. 1, shown schematically secured to a vehicle for transport, and shown in a level orientation.
Figure 7:
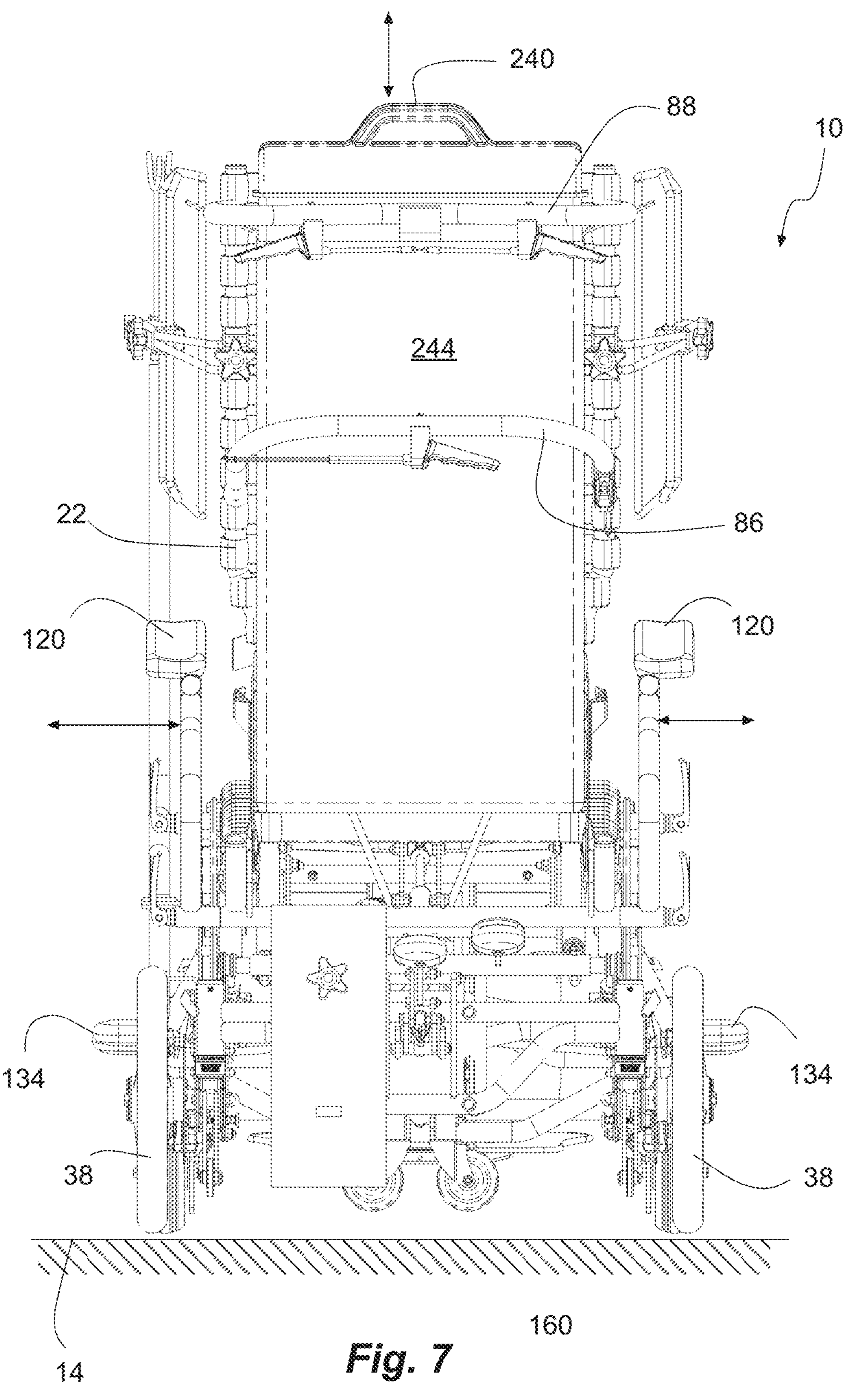
FIG. 7 is a rear view of the transport wheelchair of FIG. 1.
Figure 8:
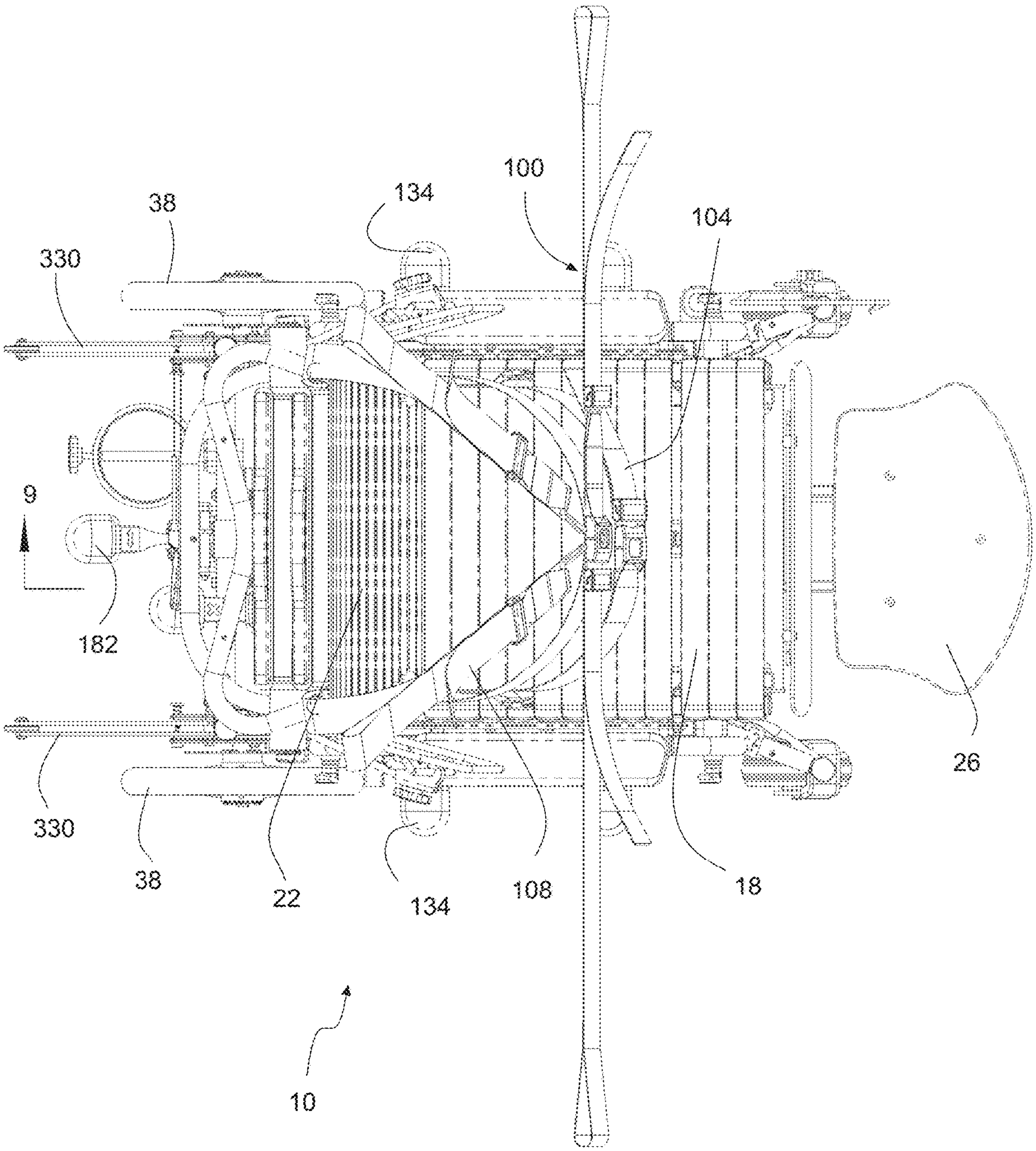
FIG. 8 is a top view of the transport wheelchair of FIG. 1.
Figure 9:
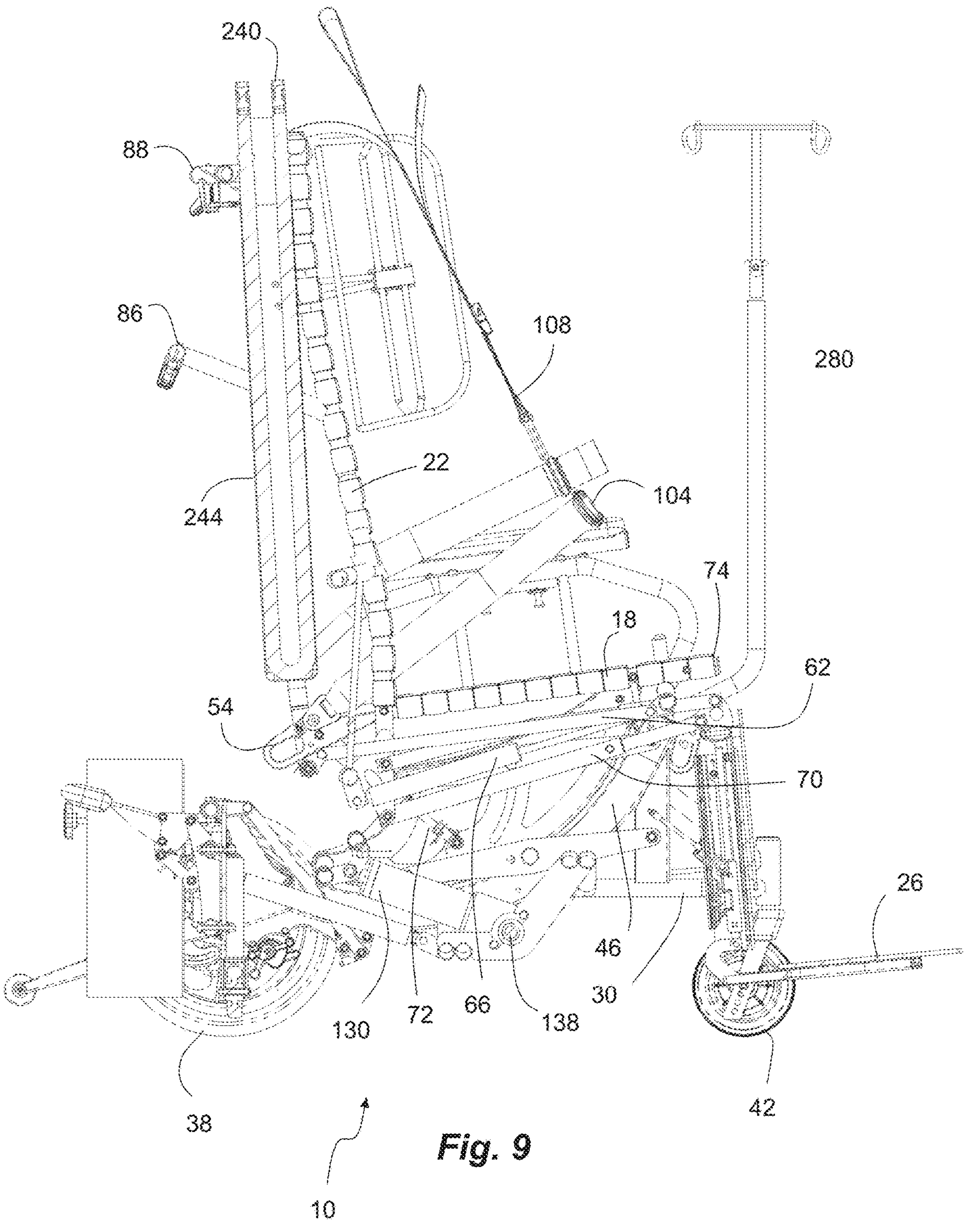
FIG. 9 is a cross-sectional side view of the transport wheelchair of FIG. 1, taken along line 9 of FIG. 8.
Figure 12:
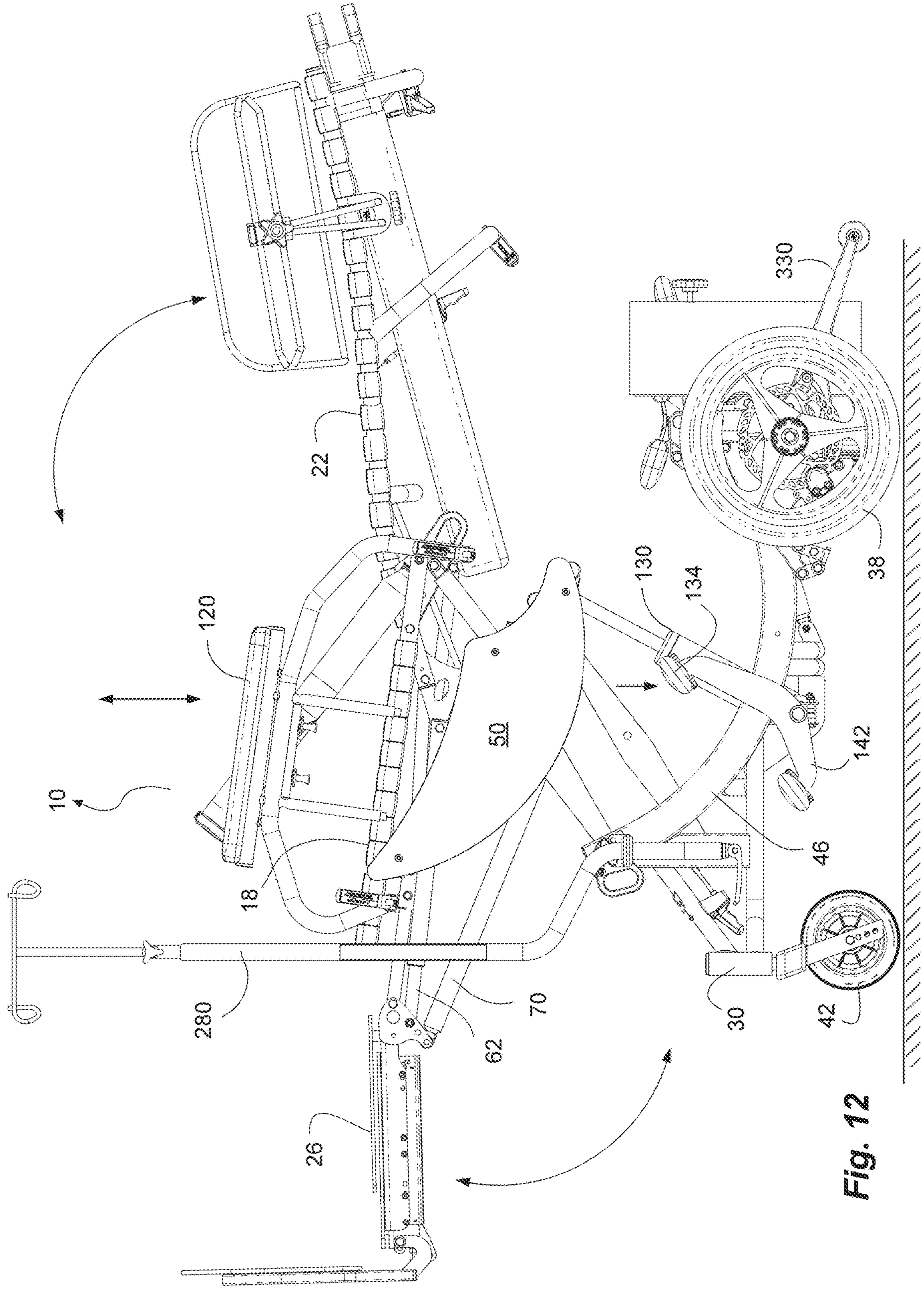
FIG. 12 is a side view of the transport wheelchair of FIG. 1, shown in the relined configuration and an elevated position.
Figure 14:
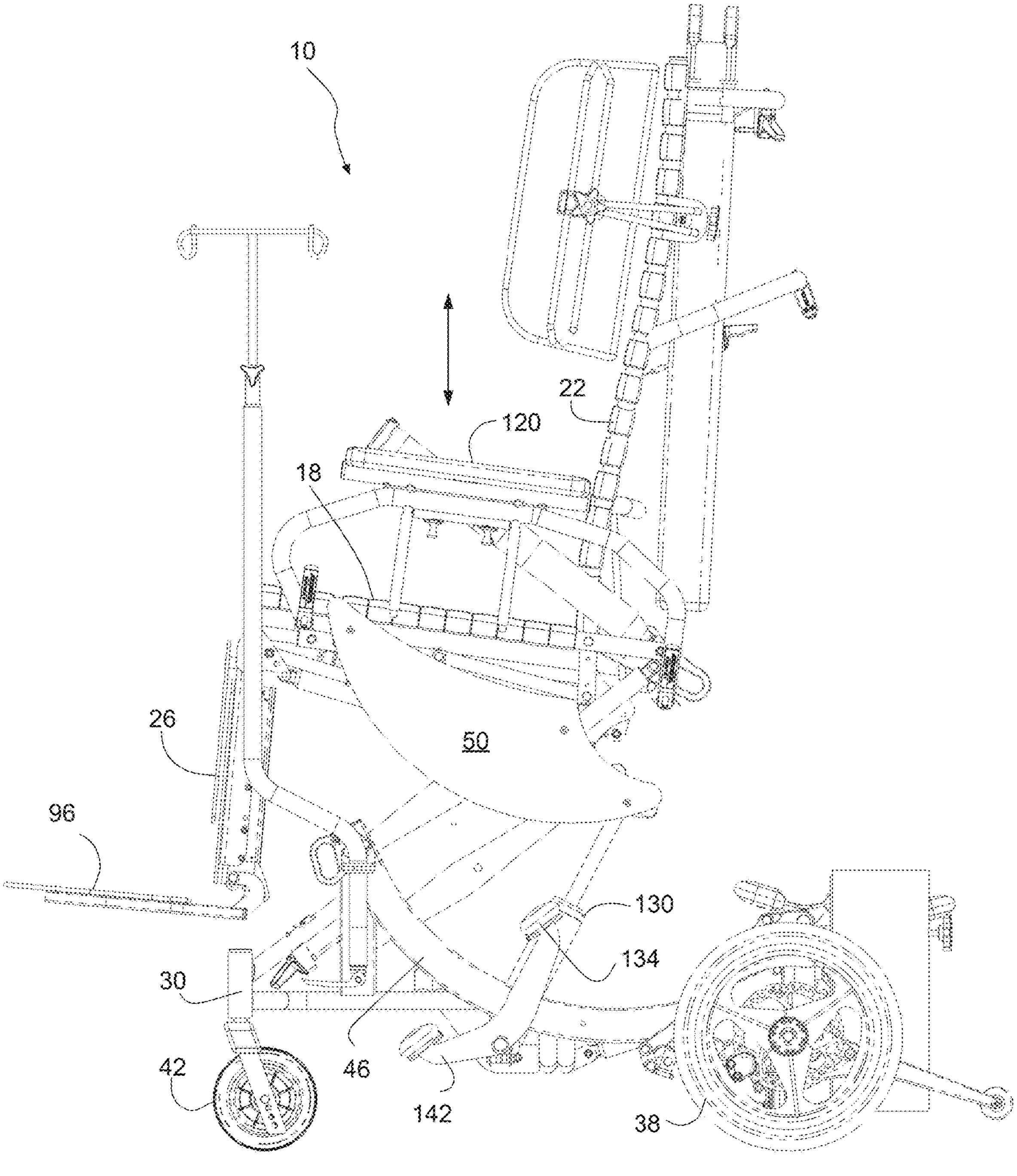
FIG. 14 is a side view of the transport wheelchair of FIG. 1.

As described herein, the frame 30 can have a wheel base 46 and chair base 50 movable with respect to the wheel base 46, as shown in FIGS. 9, 12 and 14. The wheel base 46 can be coupled to the set of wheels 34. The frame 30, and the wheel base 46 and the chair base 50, can be formed of metal, such as metal tubing, welded together. The frame 30 can have at least two securement points, such as rings 54, for engagement by fasteners and straps (represented schematically at 58 in FIG. 6) to secure the wheelchair 10 to the vehicle 14. For example, the frame 30 can have four securement points (e.g. rings) 54, with two in the front and two in the back. In one aspect, the wheel base 46 can have two securement points or rings 54 in the front, while the chair base 50 can have two securement points of rings 54 in the rear. Thus, both the wheel base 46 and the chair base 50 of the frame 30 can be secured, as shown in FIG. 6. In one aspect, the securement points or rings 54 can be vertically oriented and can extend from the frame 30 in a vertical layer or parallel with a vertical plane. In another aspect, the securement points or rings 30 in the back and coupled to the chair base 50 or the seat 18 can also be coupled to, or share a connection with, a restraint system (100), as discussed herein, and as shown in FIGS. 2, 4 and 9.

Figure 10:
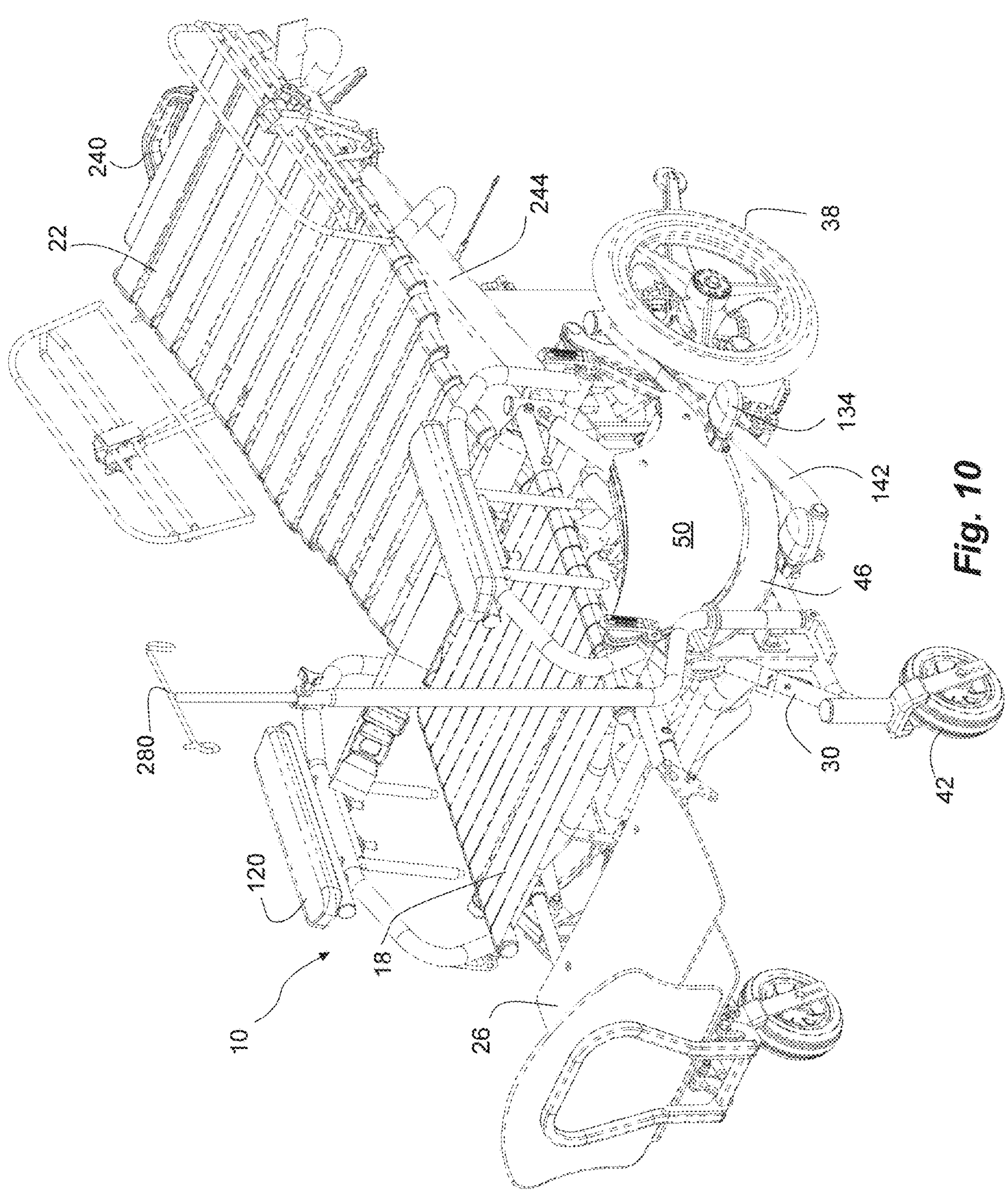
FIG. 10 is a perspective view of the transport wheelchair of FIG. 1, shown in a reclined configuration and a lowered position.
Figure 11:
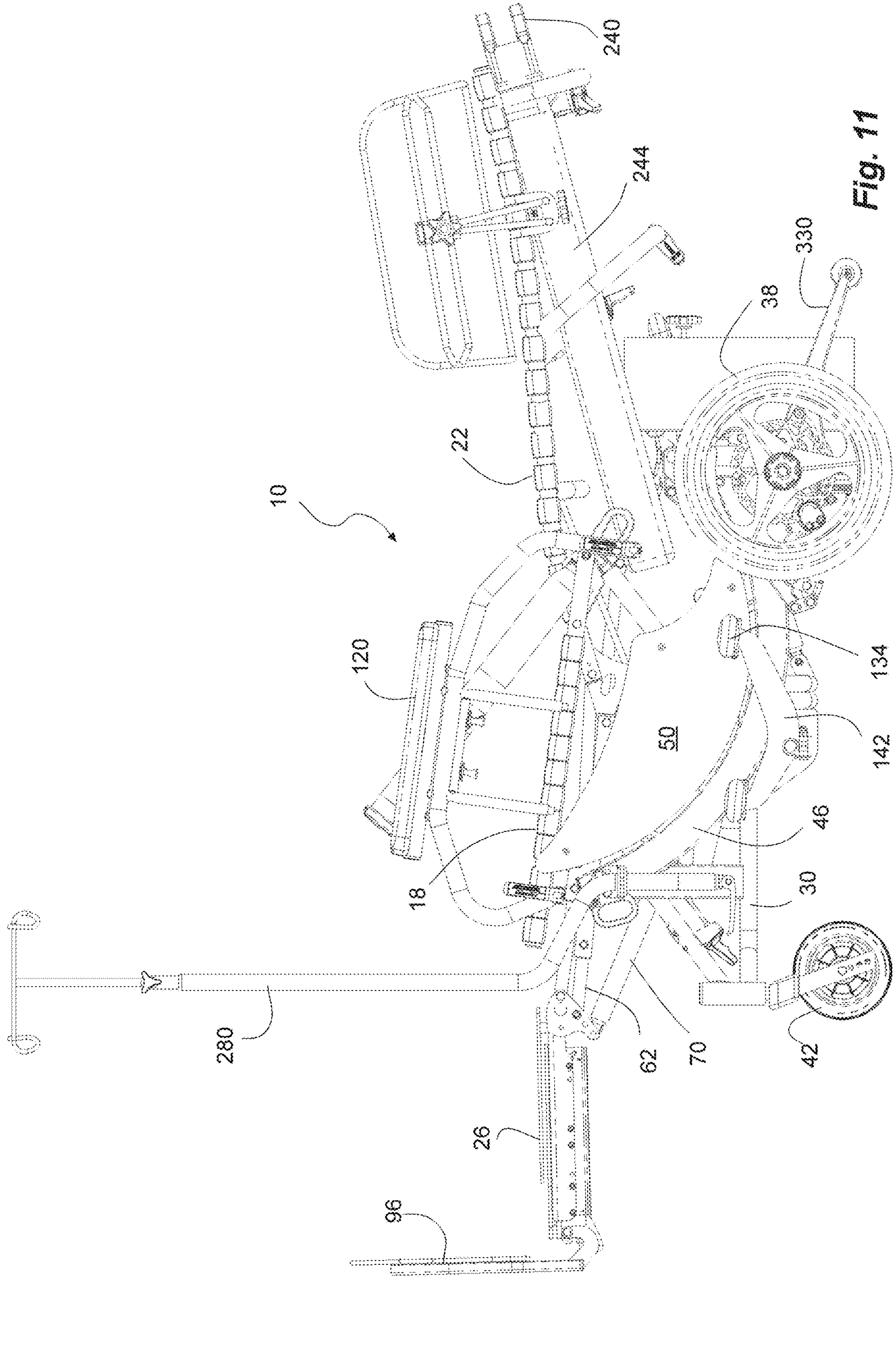
FIG. 11 is a side view of the transport wheelchair of FIG. 1.

The seat 18, the backrest 22 and the legrest 26 can be carried by and coupled to the chair base 50 of the frame 30. The seat 18, the backrest 22 and the legrest 26 can be movable with the chair base 50 with respect to the wheel base 46. The backrest 22 and the legrest 26 can be pivotal with respect to the seat 18. The seat 18, the backrest 22 and the legrest 26 can have at least two configurations, including: 1) a chair configuration, as shown in FIGS. 1-9, 13 and 14, and a reclined configuration, as shown in FIGS. 10-12. In the chair configuration, the backrest 22 and the legrest 26 can be upright with respect to the seat 18. In the chair configuration, the seat 18, the backrest 22 and the legrest 26 can correspond to a seated position of the patient. The backrest 22 can be substantially vertical with a small degree from vertical for comfort. Similarly, the legrest 26 can be substantially vertical with a small degree from vertical for comfort. The chair configuration can be used when transferring a patient in a seated position from a chair or other furniture to the wheelchair 10. The chair configuration can also be used when transporting the patient in the vehicle 14.

In the reclined configuration, the backrest 22 can be laid-back with respect to the seat 18, and the legrest 26 can be raised with respect to the seat 18. The backrest 22, the seat 18 and the legrest 26 can be substantially horizontal. The backrest 22 can have a small degree of incline from horizontal, the front of the seat 18 can have a small degree of incline from horizontal, and the legrest 26 can have a small decline from horizontal, for comfort. In the reclined configuration, the backrest 22, the seat 18 and the legrest 26 can correspond to a reclined and laying position of the patient. The relined configuration can be used when transferring a patient in a reclined position from a bed or other furniture to the wheelchair 10.

The bottom of the backrest 22 can be pivotally coupled with respect to the back of the seat 18. The top of the legrest 26 can be pivotally coupled with respect to the front of the seat 18. In one aspect, the legrest 26 can be pivotally coupled to linkages which can slide forward relative to the seat 18 when the backrest 22 is reclined. In another aspect, the backrest 22 and the legrest 26 can be linked together by a linkage 62 (FIG. 9) so that the backrest 22 and the legrest 26 can pivot from the chair configuration to the reclined orientation together. The linkage 62, and the backrest 22 and the legrest 26, can include a lockable energy storage device, such as lockable gas springs 66 and 70, to maintain the chair and reclined configurations until unlocked. In another aspect, the backrest 22 and/or the legrest 26 can have up to 90 degrees of recline. In another aspect, the backrest 22 and the legrest 26 can be oriented independently. In one aspect, the backrest 22 and the legrest 26 can have multiple or infinite relative positions with respect to the seat 18. In another aspect, the backrest 22 and the legrest 26 can have multiple discrete positions with respect to the seat 18.

Figure 30:
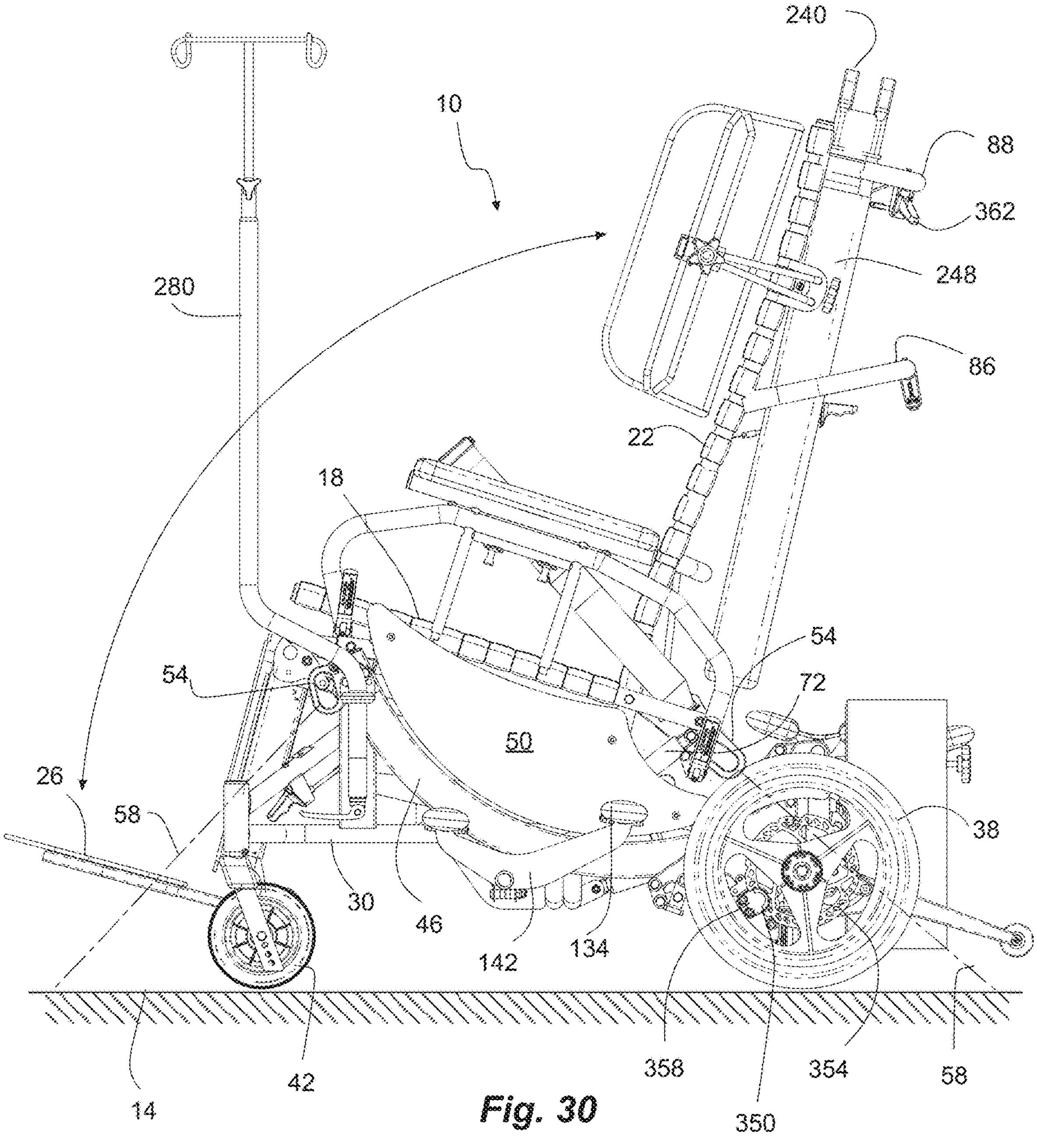
FIG. 30 is a side view of the transport wheelchair of FIG. 1, shown in a tilted orientation.

In one aspect, the seat 18, the backrest 22 and the legrest 26 can also tilt together for comfort. The front of the seat 18 or the chair base 50 can be pivotal and pivotally coupled with respect to the wheel base 46 and the frame 30. The seat 18, along with the backrest 22 and the legrest 26, can be tilted together in fore and aft directions about the front of the seat 18 up to 20 degrees. In another aspect, the seat 18 can remain substantially horizontal in a level orientation. The seat 18, the backrest 22 and the legrest 26 can have a tilted orientation in which the seat 18, along with the backrest 22 and the legrest 26, can be tilted aft about the front of the seat 18 at an inclined acute angle with respect to horizontal (up to 20 degrees) to facilitate patient retention in the wheelchair 10, as shown in FIG. 30. The tilted orientation can be used when transporting a patient in the vehicle 14. The seat 18, along with the backrest 22 and the legrest 26, can include a lockable energy storage device, such as a lockable gas spring 72, to maintain the tilted orientation, or a level orientation, until unlocked. In one aspect, the seat 18, along with the backrest 22 and the legrest 26, can have multiple or infinite relative positions with respect to the front of the seat 18. In another aspect, the seat 18, along with the backrest 22 and the legrest 26, can have multiple discrete orientation with respect to the front of the seat 18.

The seat 18 can have a seat frame 74 with straps 78 extending laterally across the seat frame 74 for comfort. The seat frame 74 can be part of the chair base 50. A seat cushion (not shown) can be placed over the straps 78. Similarly, the backrest 22 can have a backrest frame 82 with straps 78 extending laterally across the backrest frame 82 for comfort. A backrest cushion (not shown) can be placed over the straps 78. The straps 78 can be taut but compliant for comfort. Both the seat frame 74 and the backrest frame 82 can have opposite lateral members and fore and aft members. The backrest frame 82 can have intermediate members 86 extending between the opposite lateral members. A top member 88 and the intermediate member 86 of the backrest frame 82 can be bowed and/or spaced apart from the straps 78 to form a gap to receive the straps 78 when deflected under weight of the patient. The top and intermediate members 88 and 86 respectively can also be used as handles to grasp and maneuver the wheelchair 10. In addition, the top and intermediate members 88 and 86 can carry handles or triggers that are coupled via cables to lockable gas cylinders to release the gas cylinder to transition the wheelchair 10 between configurations, such as the collapsed and extended configurations. In addition, the top and intermediate members 88 and 86 can carry brake handles coupled via cables to calipers of brakes.

The legrest 26 can have a plate 92 associated with the lower legs of the patient. In one aspect, a pair of telescoping plates can move relative to one another to form a selected length. A footrest 96 can be coupled to a distal end of the legrest 26. The footrest 96 can pivot with respect to the legrest 26 between an extended orientation perpendicular to the legrest during use, and a folded orientation against the legrest 26 when unneeded. The legrest 26 can pivot independently with respect to the seat 18. The legrest 26 can have a linkage 62 between the legrest 26 and the seat 18 and/or the seat frame 74 with a locking gas spring 66 and/or 70 to maintain a select orientation of the legrest 26.

The wheelchair 10 can have a belt restraint system 100 (FIG. 8) for safety. In one aspect, the belt restrain system 100 can comprise a multi-point harness with lap restraint 104 and a shoulder harness 108. The lap restraint 104 can be coupled to opposite lateral sides of the seat 18 or chair base 50 and with an intermediate buckle. In one aspect, the lap restraint 104 can be coupled to the securement points or rings 54 in the back and that are coupled to the seat 18 or the chair base 50, as shown in FIGS. 2, 4 and 9. The shoulder harness 108 can have opposite side belts coupled to the backrest 22 and secured to a buckle associated with the lap restraint.

Figure 16:
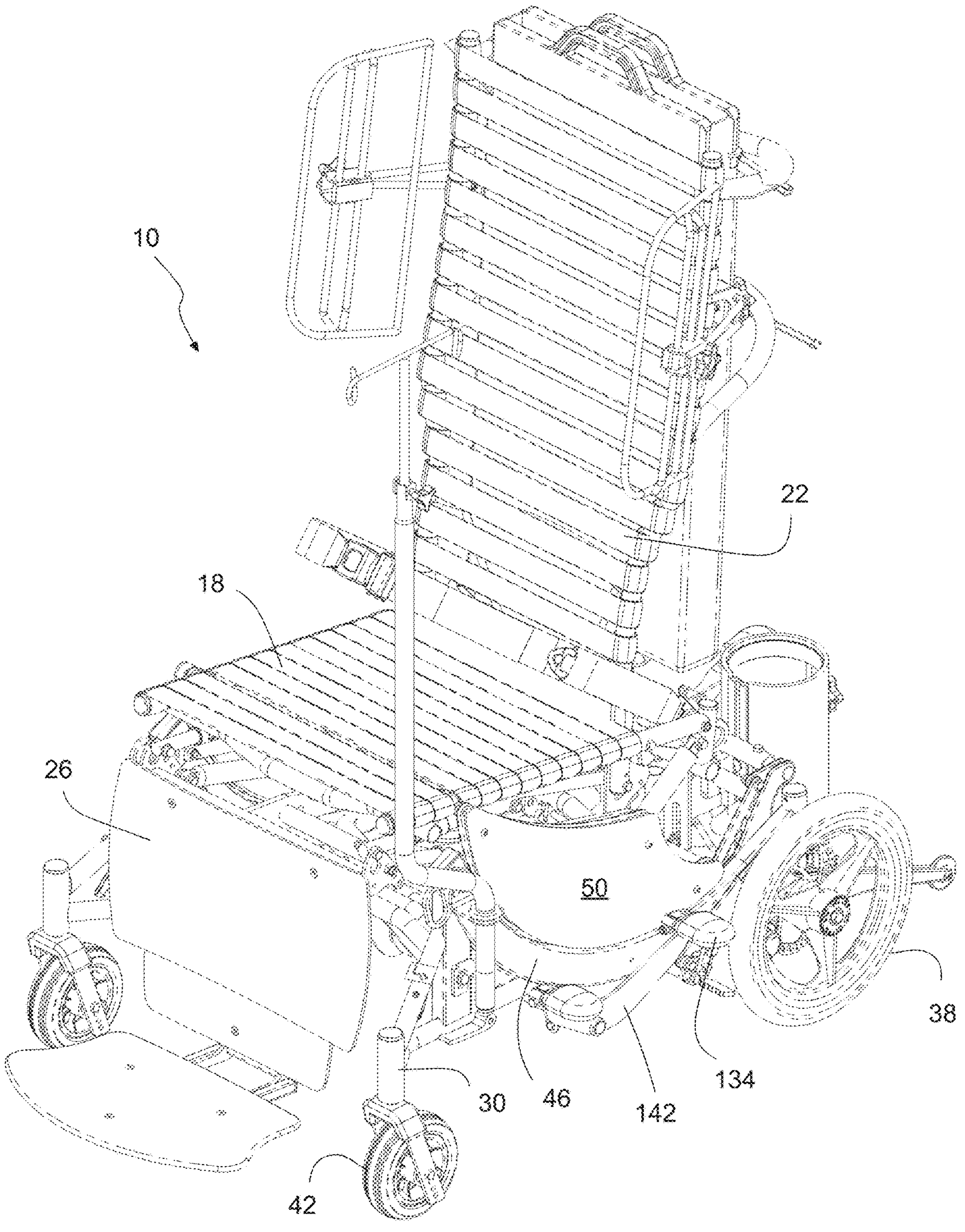
FIG. 16 is a perspective view of the transport wheelchair of FIG. 1, shown with armrests removed in accordance with some embodiments.
Figure 17:
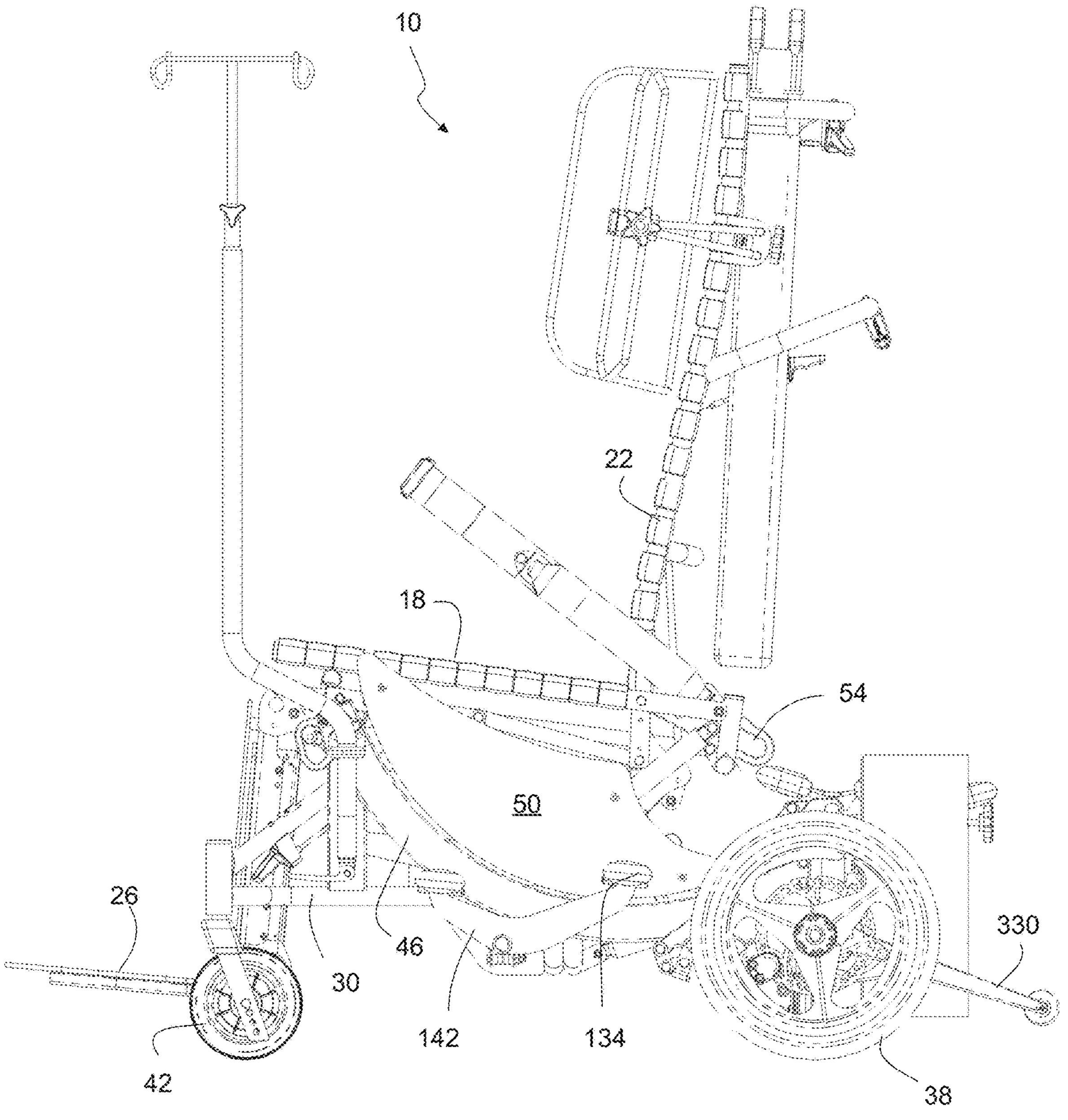
FIG. 17 is a side view of the transport wheelchair of FIG. 1.

A pair of armrests 120 can be removably and adjustably coupled with respect to the seat 18. Each armrest 120 can have an attached position on a lateral side of the seat 18, as shown in FIGS. 1-14, and a removed position away from the seat 18, as shown in FIGS. 16 and 17. The armrests 120 can be attached for comfort and protection. The armrests 120 can be removed to facilitate transfer of the patient to and from the wheelchair 10 in a lateral direction. For example, the armrest 120 can be removed from a side of the wheelchair 10 adjacent a bed, a chair or other furniture so that the patient can be laterally transferred from the bed, the chair or other furniture to the wheelchair 10. In one aspect, the removed position of the armrest 120 can correspond to the reclined configuration of the wheelchair 10 when transferring a patient from a bed to the wheelchair 10. Pads (not shown) can be disposed on and/or over the armrests for comfort.

Lift Mechanism and Vertical Height of Seat

Figure 13:
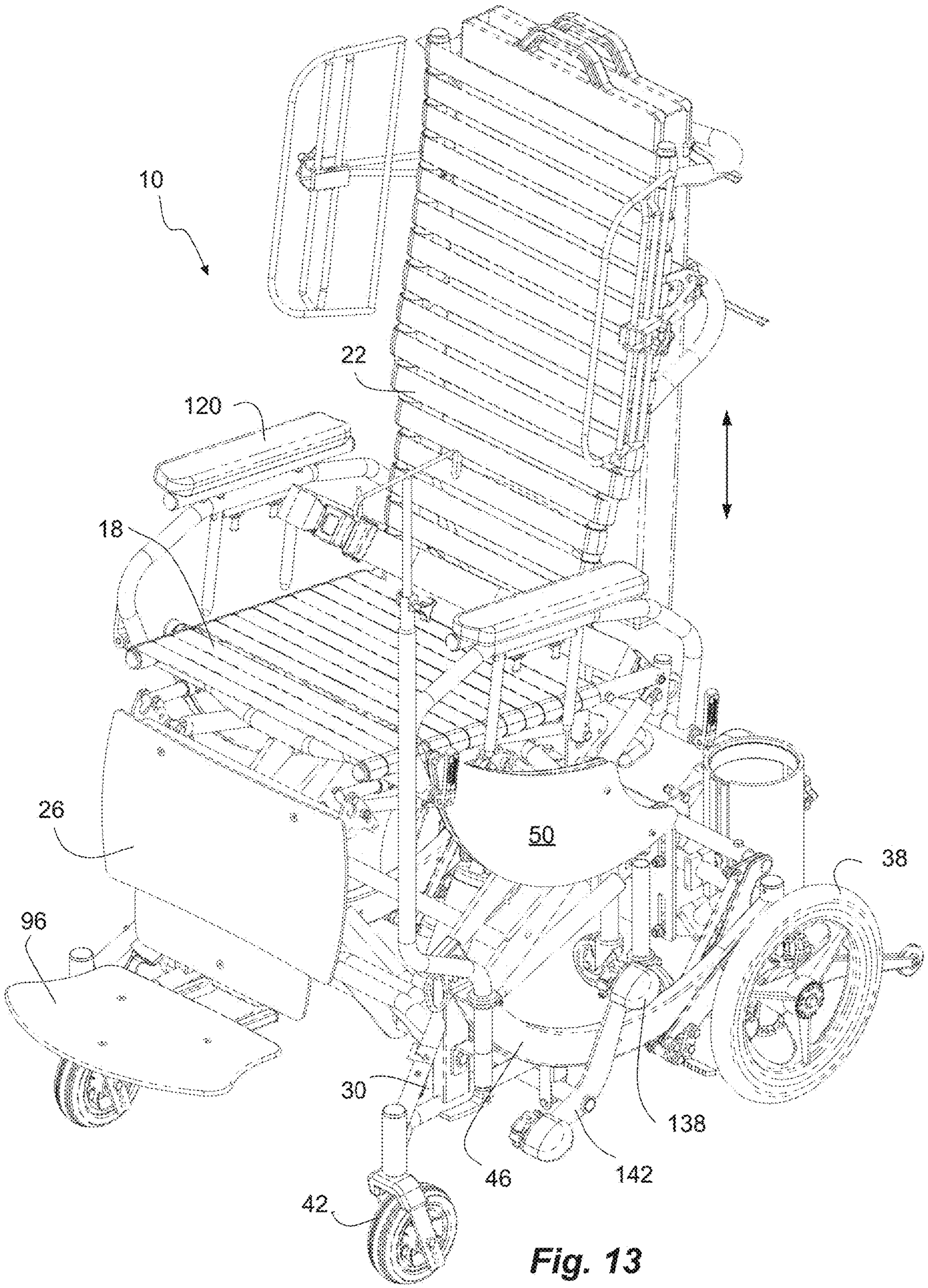
FIG. 13 is a perspective view of the transport wheelchair of FIG. 1, shown in the chair configuration and the elevated position.

The seat 18, the backrest 22 and the legrest 26 can be movably coupled to the frame 30. The seat 18, the backrest 22 and the legrest 26 can be carried by the chair base 50; and the chair base 50 can be movably coupled to the wheel base 46. The seat 18, the backrest 22 and the legrest 26 can be capable of being selectively elevated. Thus, the seat 18, the backrest 22 and the legrest 26 can be vertically positioned at a select elevation relative to a bed, a chair or other furniture for patient transfer from the bed, the chair or other furniture to the wheelchair 10. In addition, the seat 18, the backrest 22 and the legrest 26 can be vertically positioned in the reclined configuration, as shown in FIG. 12, so that the seat 18, the backrest 22 and the legrest 26 can match an elevation and horizontal orientation of a bed. In addition, the seat 18, the backrest 22 and the legrest 26 can be vertically positioned in the chair configuration, as shown in FIGS. 13 and 14, so that the seat 18 can match an elevation of a chair. The seat 18, the backrest 22 and the legrest 26 can be vertically positioned at an elevation between substantially 22.5 and 32 inches (57 to 81 cm) as measured between the seat 18 and the ground. The wheelchair 10 and the chair base 50, or the seat 18, the backrest 22 and the legrest 26, can have at least two elevations, including a lowered elevation, as shown in FIGS. 1-11, and a raised elevation, as shown in FIGS. 12-14. In one aspect, the wheelchair 10 can be adjusted to multiple different seat heights. Thus, the seat 18 of the wheelchair 10 can be elevated to match a bed, and chair or other furniture for patient transfer.

Figure 15:
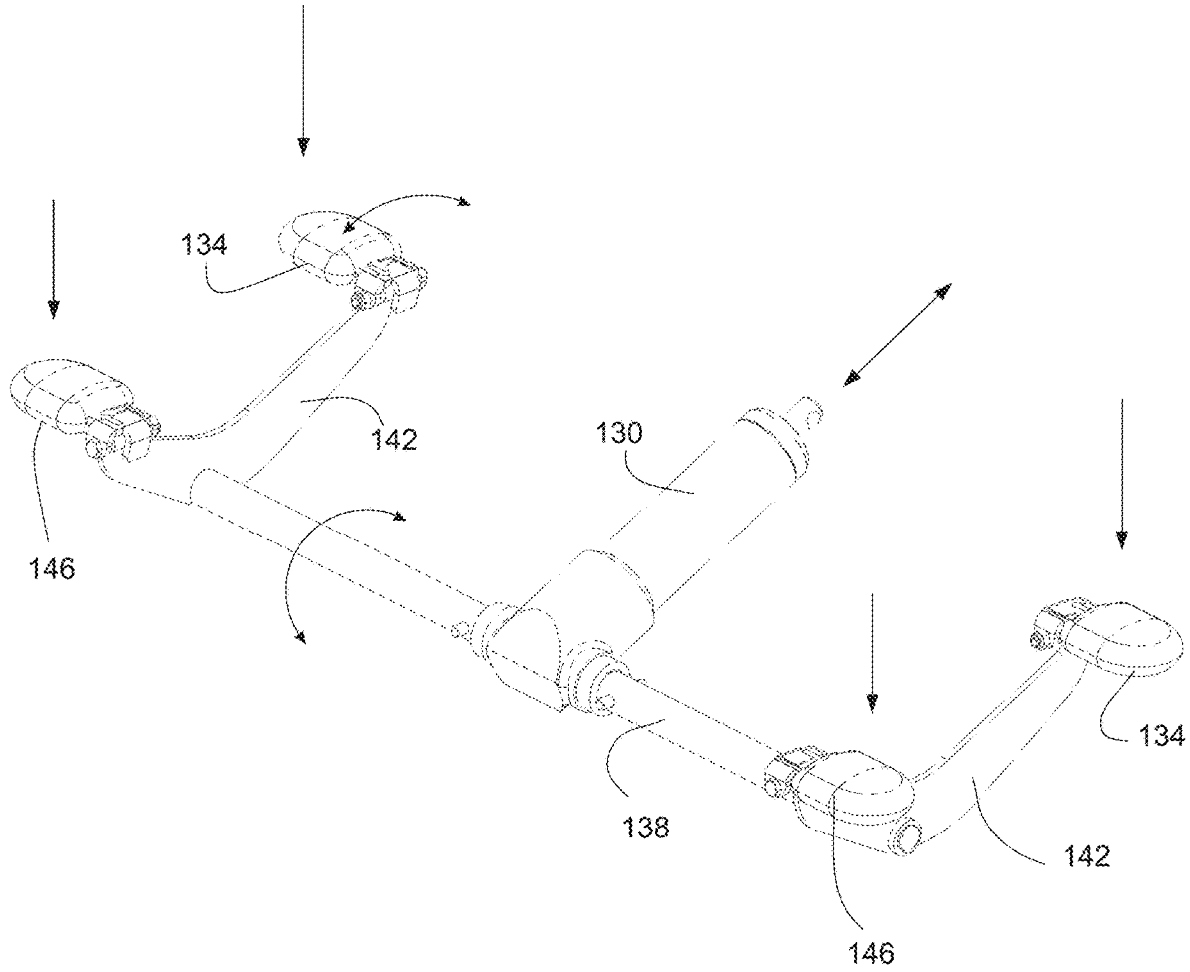
FIG. 15 is a perspective view of a lift mechanism of the transport wheelchair of FIG. 1 in accordance with some embodiments.

Referring to FIGS. 12, 14 and 15, as discussed herein, the seat 18, the backrest 22 and the legrest 26 can be elevated to match an elevation of a bed, a chair or other furniture. The chair base 50 can be elevated with respect to the wheel base 46. In one aspect, an actuator 130 can be coupled to and between the frame 30 or wheel base 46 and the chair base 50. The actuator 130 can selectively elevate chair base 50 with the seat 18, the backrest 22 and the legrest 26 with respect to the frame 30 and the wheel base 46. In one aspect, the actuator 130 can be a manual actuator without a motor or a power source, such as an electric motor and a battery. Thus, the wheelchair 10 can be lighter to be manipulated and maneuvered by a single person. For example, the actuator 130 can comprises a hydraulic cylinder coupled to and between the wheel base 46 and the chair base 50. The hydraulic cylinder can be manually actuated to pump hydraulic fluid to a hydraulic cylinder and extend a hydraulic piston.

In another aspect, the actuator 130 can be operated from a lateral side of the wheelchair 10 to allow access when the wheelchair 10 is in the reclined configuration, and the legrest 26 and the backrest 22 extend fore and aft beyond the frame 30 and the wheel base 46. A first lateral actuator pedal 134 can be operatively coupled to the actuator 130 to operate the actuator 130. The first lateral actuator pedal 134 can be coupled to the frame 30 or the wheel base 46, and can be positioned at a lateral side of the frame 30 or the wheel base 46. The lateral position of the actuator pedal 134 can allow access to raise and lower the seat 18 and the chair base 50 when in the reclined orientation. In one aspect, the first lateral actuator pedal 134 can be pivotal between a folded orientation and an extended orientation, as described herein with respect to a pedal for a pivot wheel.

In another aspect, the first lateral actuator pedal 134 can comprise a pair of opposite, first lateral actuator pedals 134, each disposed on a different lateral side of the frame 30 or the wheel base 46. A connector 138 can span the frame 30 and the wheel base 46 between the pair of lateral actuator pedals 134. An intermediate portion of the connector 138 can engage the actuator 130. The first lateral actuator pedal 134 can be repeatedly depressed, causing the connector 138 to pivot back and forth, to pump hydraulic fluid in the hydraulic cylinder, extending a hydraulic piston of the hydraulic cylinder, and raising the seat 18 and the chair base 50.

In another aspect, a rocker bar 142 can be operatively coupled to the actuator 130 to operate the actuator 130. The rocker bar 142 can be coupled to the frame 30 or the wheel base 46, and positioned at a lateral side of the frame 30 and the wheel base 46. A pair of pedals 134 and 146 can be located at opposite ends of the rocker bar 142. One pedal 134 can be a first lateral actuator pedal 134 to actuate the actuator 130 or hydraulic cylinder to elevate. Another second, release, lateral pedal 146 can release the actuator 130, such as by releasing the hydraulic fluid to allow the piston to retract, and lower the seat 18 and the chair base 50. As described herein, the pedals 134 and 146 can be pivotally coupled to the rocker bar 142 and pivotal between a folded orientation and an extended orientation. In another aspect, the rocker bar 142 can comprise a pair of rocker bars 142, each disposed on a different lateral side of the frame 30 and the wheel base 46. The connector 138 can extend between the pair of rocker bars 142.

In one aspect, the wheelchair 10 can have at least three configurations, including: a patient acquisition configuration (FIG. 12), a patient transport configuration (FIGS. 1-9), and a patient passenger configuration (FIG. 6). In the patient acquisition configuration, at least one of the pair of armrests 120 can be in the removed position; the seat 18, the backrest 22 and the legrest 26 can be in the reclined configuration; and the chair base 50 with the seat 18, the backrest 22 and the legrest 26 can be in the raised elevation, configured to transfer a patient to the wheelchair, as shown in FIG. 12. In the patient transport configuration, the pair of armrests 120 can be in the attached position; the seat 18, the backrest 22 and the legrest 26 can be in the chair configuration (or the tilted configuration); and the chair base 50 with the seat 18, the backrest 22 and the legrest 26 can be in the lowered elevation, configured to transport the patient with the wheelchair 10, as shown in FIGS. 1-9. In the patient passenger configuration, the wheelchair 10, with the patient thereon, can be positioned in a motor vehicle 14; the securement points, such as rings 54, of the wheelchair 10 can be coupled to the motor vehicle 14, such as with fasteners and straps 58; the pair of armrests 120 can be in the attached position; and the chair base 50 with the seat 18, the backrest 22 and the legrest 26 can be in the lowered elevation, configured to transport the patient with the motor vehicle 14 with the patient in the wheelchair 10. In another aspect, the wheelchair 10 can be in the tilted orientation in the patient passenger configuration.

In another aspect, the wheelchair 10, or the seat 18, the backrest 22 and the legrest 26, can have four different configurations, positions and orientations, including chair lowered (FIGS. 1-8), chair elevated (FIGS. 13 and 14), reclined lowered (FIGS. 10 and 11), and reclined elevated (FIG. 12). In addition, the wheelchair 10, or the seat 18, the backrest 22 and the legrest 26, can have multiple or infinite positions and orientations in between. Furthermore, the wheelchair 10, or the seat 18, the backrest 22 and the legrest 26, can have multiple or infinite tilted orientations.

Lateral Movement and Positioning

Referring to FIGS. 2 and 20-24, in some embodiments, the wheelchair 10 can be equipped for lateral movement to facilitate positioning the wheelchair 10 proximate a bed, a chair or other furniture, and/or to facilitate positioning the wheelchair in tight locations. As described herein, the wheelchair 10 can have fixed rear wheels 38 that rotate around a laterally-oriented rotational axis for movement in the fore and aft directions. The wheelchair 10 can also have one or more auxiliary pivot wheels 160 coupled to the frame 30 and the wheel base 46. The pivot wheel 160 can be positioned at a rear of the wheelchair 10 and between the fixed rear wheels 38. The pivot wheel 160 can be positioned substantially in-line with the laterally-oriented rotational axis of the fixed rear wheels 38. The pivot wheel 160 can be oriented perpendicular to the fixed rear wheels 38 and can rotate around a longitudinally-oriented rotational axis. Thus, while the fixed rear wheels 38 can roll fore and aft, the pivot wheel 160 can roll laterally. The wheelchair 10 can be configured to selectively engage either the fixed rear wheels 38 or the pivot wheel 160. The pivot wheel 160 can be selectively positioned between an elevated position (FIGS. 2, 7, 9, 21*a*, 22*a*, 23 and 24) and a lowered position (FIGS. 21*b* and 22*b*). In the elevated position, the pivot wheel 160 can be higher than, and elevated with respect to, the fixed rear wheels 38 and off of the ground 14. In the lowered position, the pivot wheel 160 can be lower than the fixed rear wheels 38 with the fixed rear wheels 38 elevated off of the ground 14. In addition, in the lowered position, the pivot wheel 160 can roll laterally and the rear of the wheelchair 10 can move laterally.

Referring to FIGS. 20-24, the wheelchair 10 can have a slide 164 and a linkage or toggle 166 coupled to and between the frame 30 or the wheel base 46 and the pivot wheel 160 or slide 164. The slide 164 can be slidably coupled to the frame 30 or the wheel base 46 while the pivot wheel 160 can be carried by a lower end of the slide 164. The toggle 166 can be coupled to and between the frame 30 or the wheel base 46 and the slide 164. The toggle 166 can have two links 170 and 172 coupled together at a pivot 174. The toggle 166 and the links 170 and 172 can have a collapsed configuration corresponding to the elevated position of the pivot wheel 160. The toggle 166 and the links 170 and 172 can also have an extended configuration corresponding to the lower position of the pivot wheel 160. The links 170 and 172 can be substantially aligned and vertical in the extended configuration. A lockable gas cylinder 178 can be coupled to and between the frame 30 or the wheel base 46 and the pivot 174 of the toggle 166. The lockable gas cylinder 178 can hold the toggle 166 and the links 170 and 172 in the extended configuration, and the pivot wheel 160 in the lowered position, and can selectively release the toggle 166 and the links 170 and 172 to return to the collapsed configuration, and the pivot wheel 160 to the elevated position. The lockable gas cylinder 178 can be coupled via a cable to handle or trigger to release the toggle 166 to transition between the collapsed and extended configuration.

A pedal 182 can be coupled to the toggle 166 or linkage. The pedal 182 can operate to transition the toggle 166 from the collapsed configuration to the extended configuration, and to deploy the pivot wheel 160 from the elevated position to the lowered position, and to raise the fixed rear wheels 38. The pedal 182 can be coupled to one of the links, such as the upper link 170, so that depressing the pedal 182 forces the toggle 166 and the links 170 and 172 from the collapsed position to the extended configuration while also forcing the pivot wheel 160 to the lowered configuration with the ground and raise the fixed rear wheels 38. In one aspect, the pedal 182 can be pivotally coupled to the toggle 166 or linkage and pivotal between a folded orientation (FIG. 24) and an extended orientation (FIGS. 20-23). Thus, the pedal 182 can be folded out of the way when not in use, and selectively extended for use. The pedal 182 can have a lobe 186 extending from the pedal 182 and positioned to abut the toggle 166, such as the link 170, in the extended orientation, and positioned away from the toggle 166 in the folded orientation. The lobe 186 can push the links 170 and 172 into the extended configuration when the pedal 182 is depressed.

In another aspect, the pivot wheel 160 can comprise a pair of pivot wheels aligned laterally. The pair of pivot wheels 160 can form a pair of spaced-apart points of contact with the ground 14 in the lowered position for greater stability.

Armrest and Seat Width

In some embodiments, the wheelchair 10 can have a selective seat width to accommodate the patient. As described herein, the wheelchair 10 can have a maximum width suited for ramps and/or vehicle interiors. The armrests 120 can be laterally positioned to have a wider seat width to accommodate larger patients and also to have a narrower width within the wheelchair width to accommodate transportation restrictions. The pair of armrests 120 can be laterally displaceable and selectively positioned with respect to the seat 18. The seat width and the distance between the armrests 120 can be selected between about 20 and 24 inches (50 and 63 cm). Thus, each armrest 120 can have about 2 inches (5 cm) of lateral positioning. The seat width between the pair of armrests 120 can be enlarged while a width of the wheelchair 10 (e.g. between the wheels) can remain fixed to accommodate transportation. In addition, as described herein, the armrests 120 can be removed for patient transfer to and from the wheelchair 10.

Figures 18, 19:
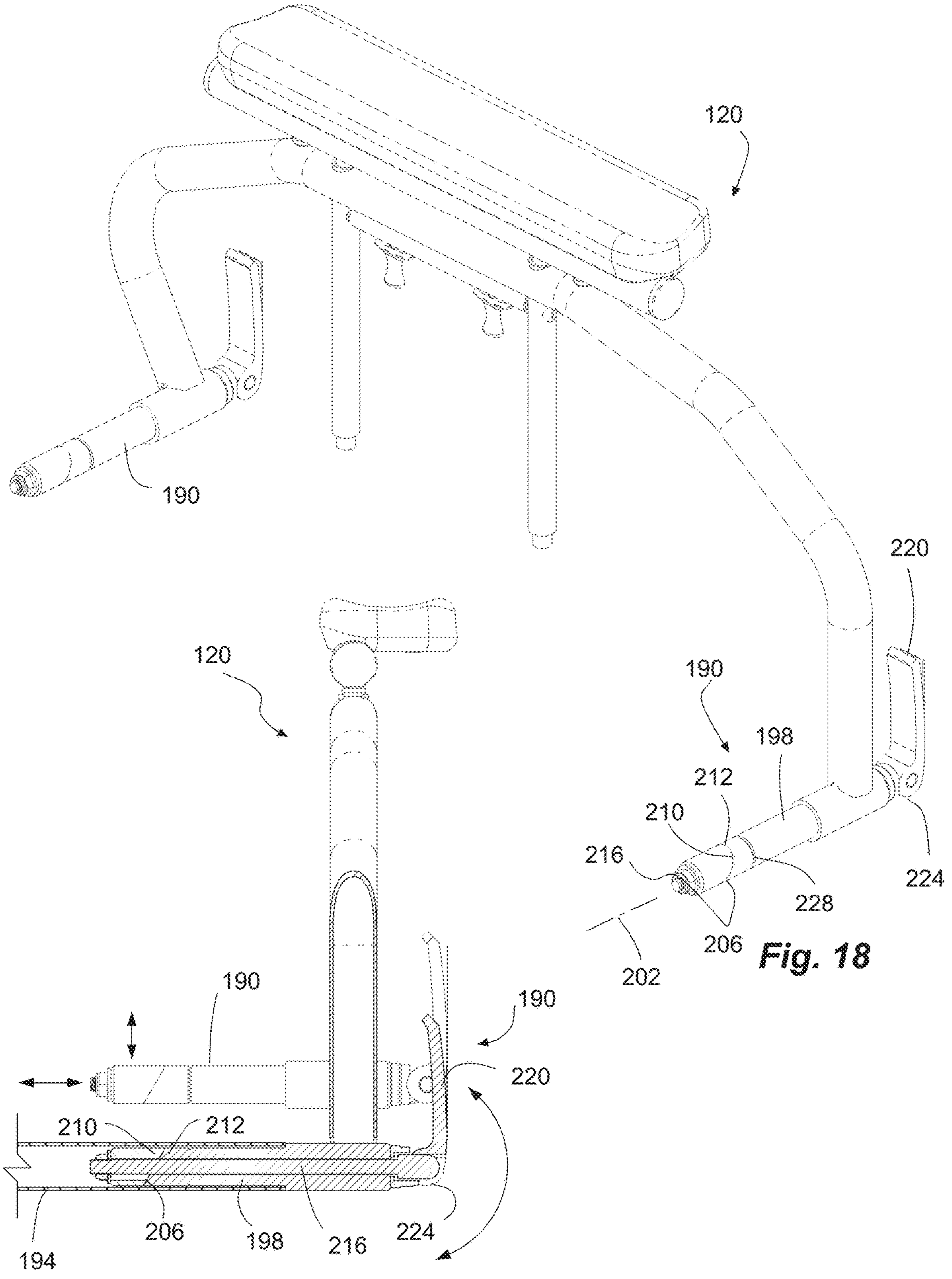
FIG. 18 is a perspective view of an armrest of the transport wheelchair of FIG. 1 in accordance with some embodiments.
FIG. 19 is a cross-sectional end view of the armrest of the transport wheelchair of FIG. 1.
Figure 20:
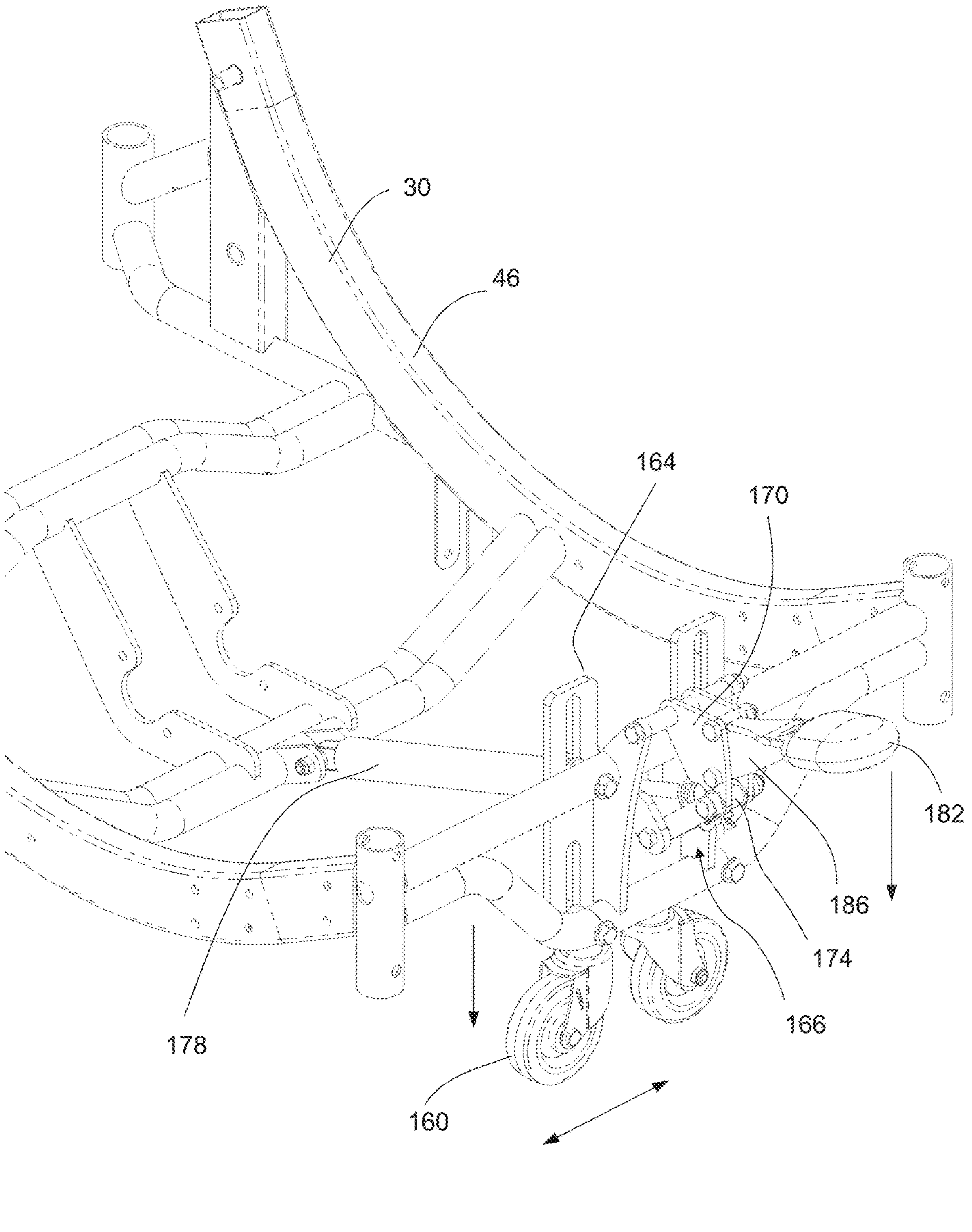
FIG. 20 is a partial perspective view of a base of the transport wheelchair of FIG. 1 showing a pivot wheel in accordance with some embodiments.
Figure 21A:
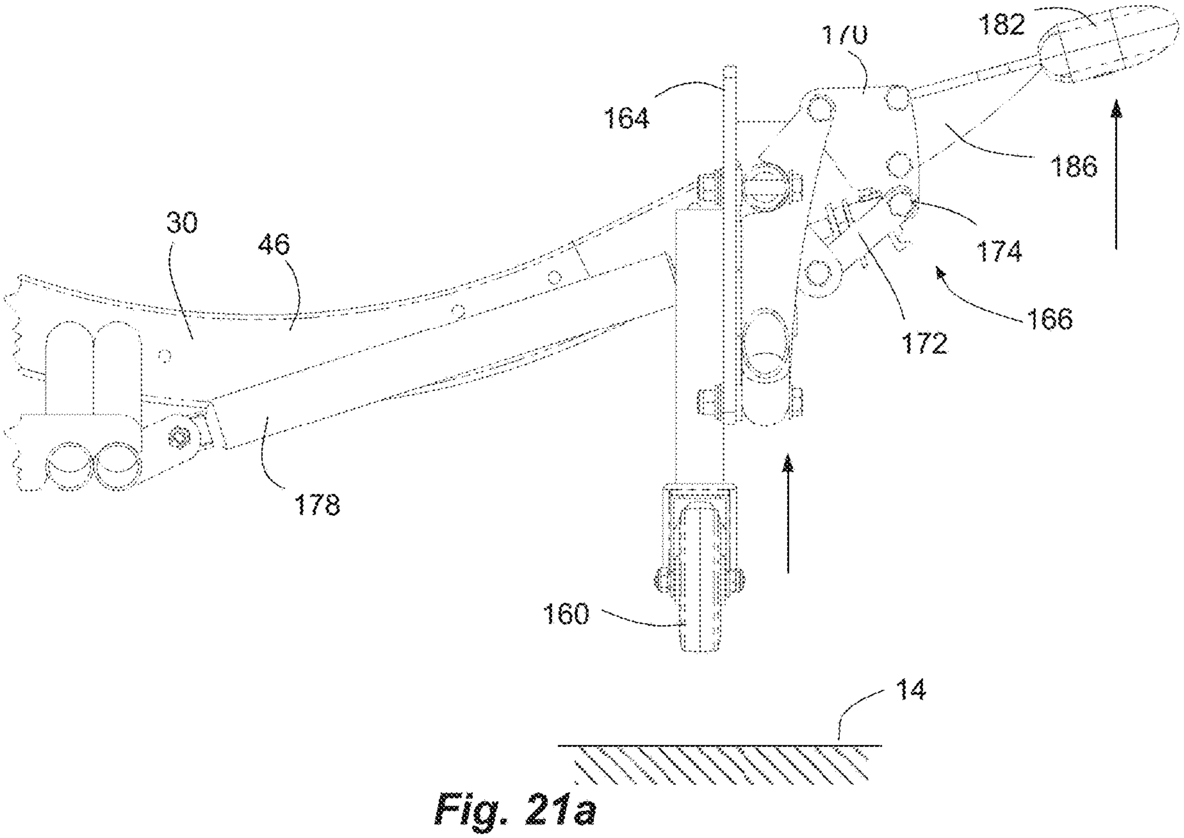
FIG. 21*a* is a partial side view of the base of the transport wheelchair of FIG. 1 showing the pivot wheel in an elevated position.
Figure 21B:
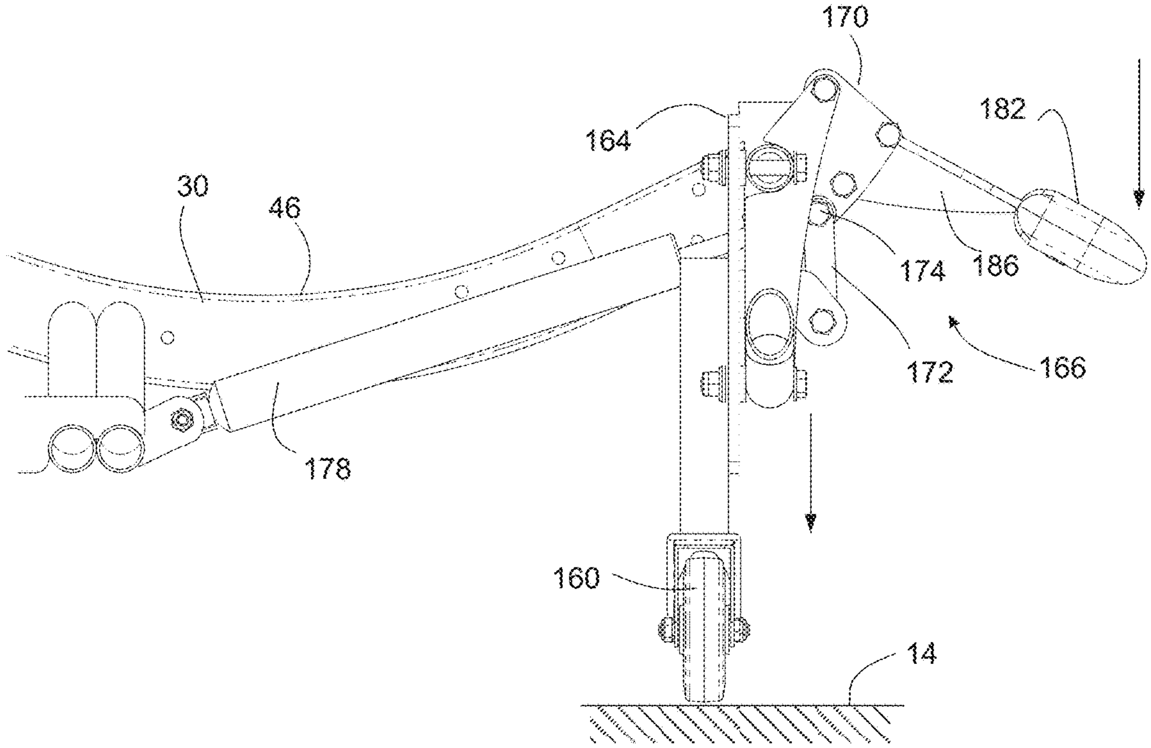
FIG. 21*b* is a partial side view of the base of the transport wheelchair of FIG. 1 showing the pivot wheel in a lowered position.
Figure 22A:
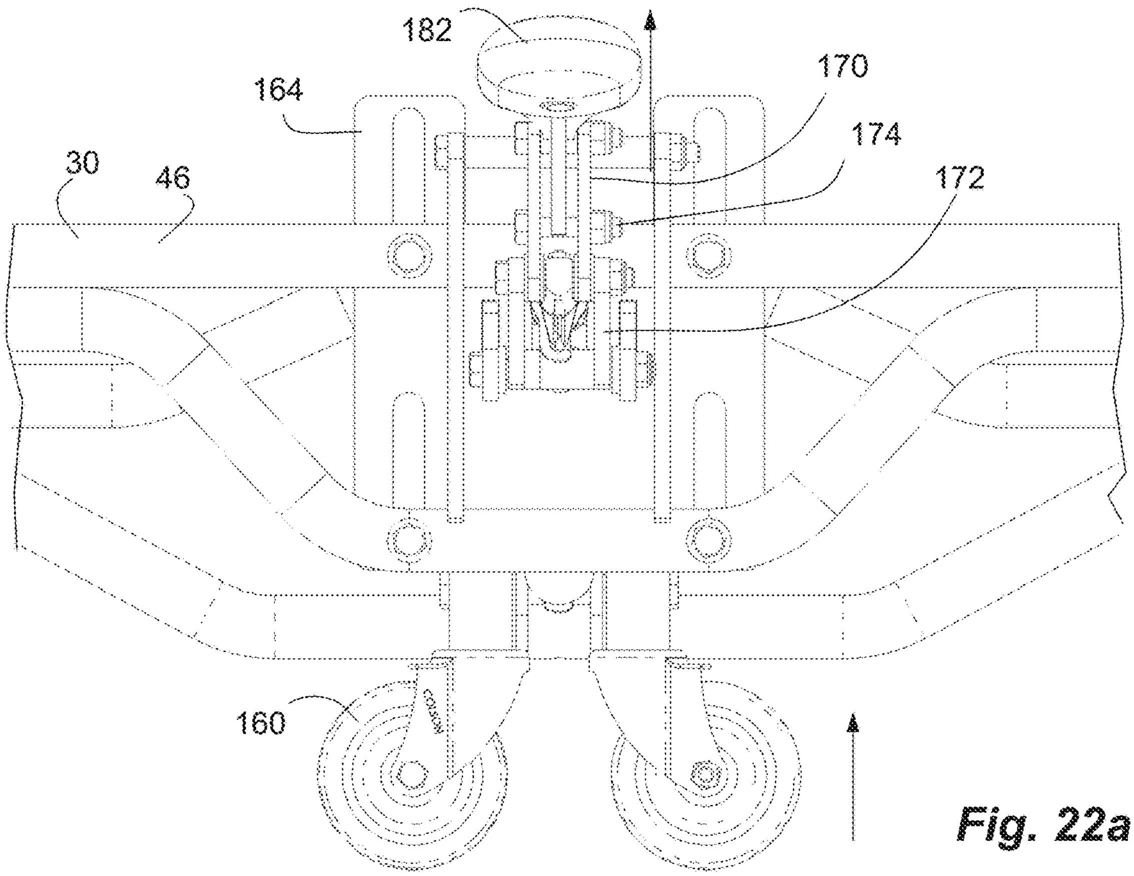
FIG. 22*a* is a partial rear view of the base of the transport wheelchair of FIG. 1 showing the pivot wheel in the elevated position.
Figure 22B:
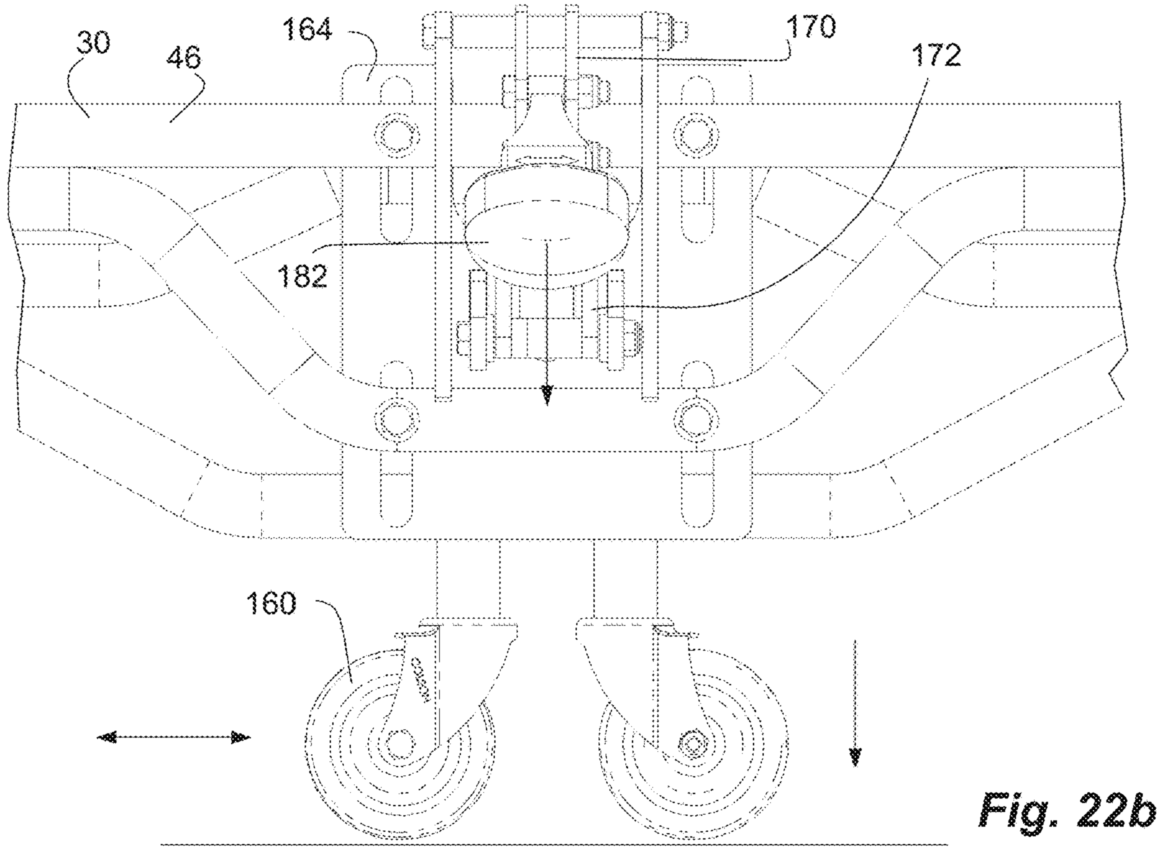
FIG. 22*b* is a partial rear view of the base of the transport wheelchair of FIG. 1 showing the pivot wheel in the lowered position.
Figure 23:
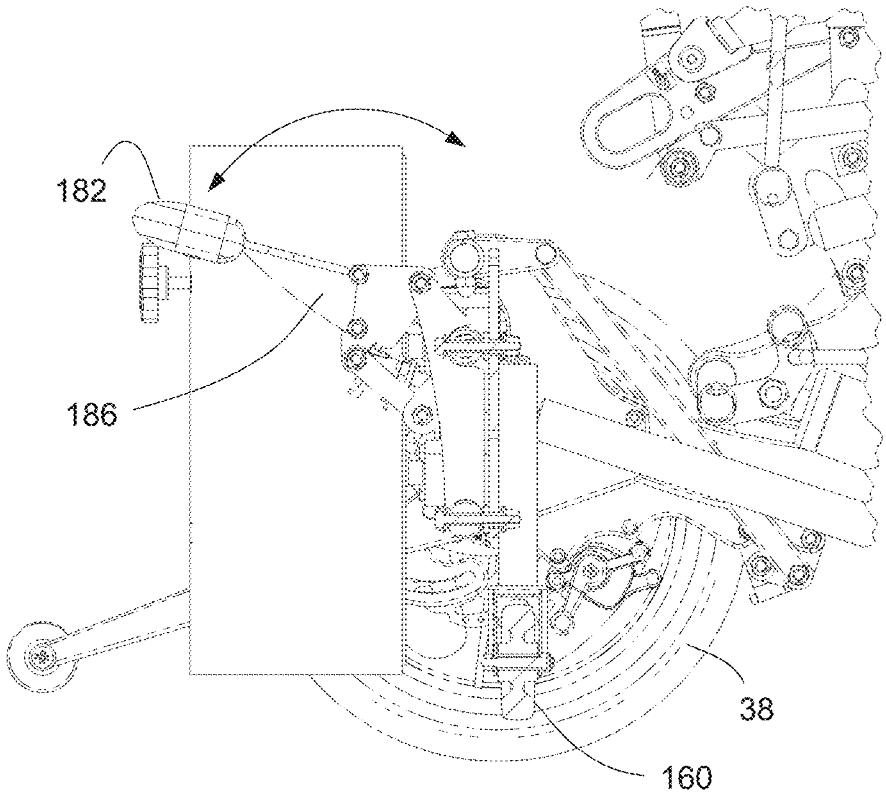
FIG. 23 is a partial cross-sectional side view of the transport wheelchair of FIG. 1, shown with a pedal in an extended orientation and anti-tip bars in a lowered orientation in accordance with some embodiments.
Figure 24:
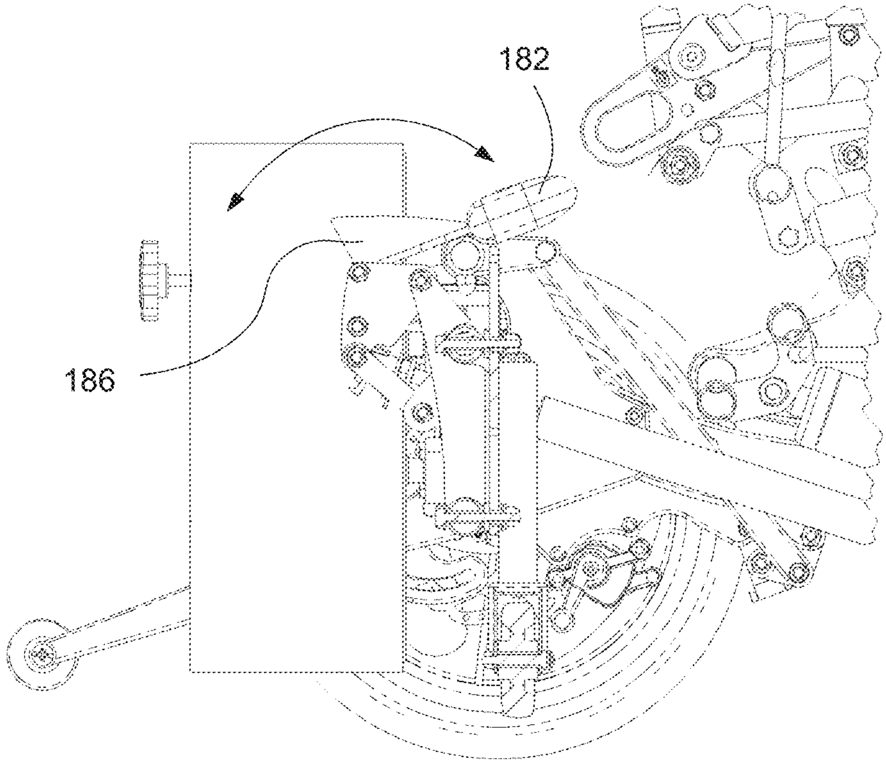
FIG. 24 is a partial cross-sectional side view of the transport wheelchair of FIG. 1, shown with the pedal in a folded orientation.

Referring to FIGS. 18 and 19, each armrest 120 can have a lock 190 to selectively lock and release the armrest 120 with respect to the seat 18 and the frame 30 or chair base 50. In addition, the lock 190 can selectively lock the armrest 120 in a desired lateral position with respect to the seat 18. The lock 190 can comprise a tube 194 associated with the frame 30, the seat 18 and/or the chair base 50. In one aspect, each side of the seat 18 can have a pair of spaced-apart tubes 194, such as a fore tube and an aft tube. Each armrest 120 can have and carry a pair of spaced-apart plugs 198, such as a fore plug and an aft plug, that can be slidably received in the spaced-apart tubes 194. Each plug 198 can be selectively expanded to grip an interior of a respective tube 194, and selectively collapsed to release from the interior of the respective tube 194. The plug 198 can have a longitudinal axis 202. The plug 198 can be bifurcated (indicated at 206) at an inclined angle with respect to the longitudinal axis 202. Opposing inclined surfaces 210 and 212 can abut to one another. A rod 216 can extend through the plug 198 from a distal end of the plug to a proximal end at the armrest 120. A cam lock lever 220 can be coupled to the proximal end of the rod 216. The cam lever 220 can be pivotal to selectively position a cam 224 against the armrest 120 to selectively draw and release the rod 216, and to selectively displace and release the bifurcated plug 198 laterally. Thus, pivoting the cam lever 220 draws the rod 216 out, causing the bifurcated plug 198 to expend outwardly (one portion with respect to another as inclined surfaces 210 and 212 move with respect to one another) against the interior of the tube 194 and locking the armrest 120 in position. Pivoting the cam lever 220 in an opposite direction releases the rod 216 to move in, allowing the bifurcated plug 198 to collapse inwardly and unlocking the armrest 120 to move or be removed. The plug 198 can have a length to allow the armrest 120 to move between inner and outer locked positions within two inches. The plug 198 can have a groove 228 to indicate a maximum extended position.

Transfer Board and Pouch

Referring to FIGS. 5-7 and 9-14, in some embodiments, the wheelchair 10 can carry a transfer board 240 to assist in transferring a patient to the wheelchair 10 from a bed. In one aspect, a pouch 244 can be carried by the backrest 22 and positioned behind the backrest 22. In another aspect, the pouch 244 can be located between a back of the backrest 22 or the straps 78 thereof, and the intermediate member 86 of the backrest frame 82. The pouch 244 can have an open upper end 248. The transfer board 240 can be removably disposed in the pouch 244 through the open upper end 248. The pouch 244, with the transfer board 240 therein, can be pivotal with the backrest 22 between the chair and recline configurations.

IV Pole

Figure 27:
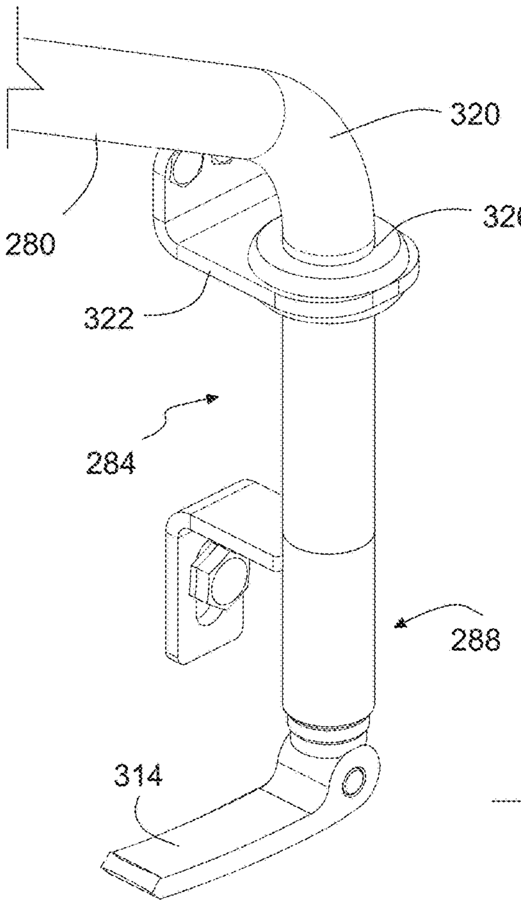
FIG. 27 is a partial perspective view of an intravenous (IV) pole and lock of the transport wheelchair of FIG. 1 in accordance with some embodiments.
Figure 28:
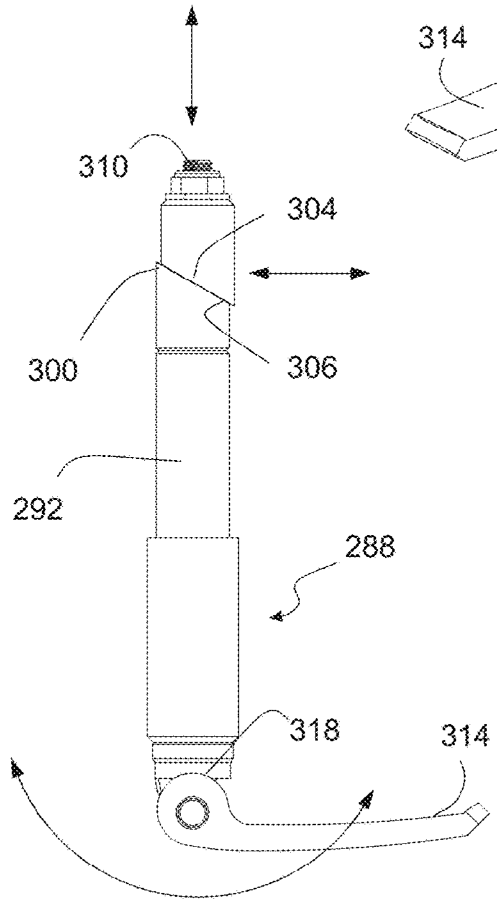
FIG. 28 is a side view of the IV lock of the transport wheelchair of FIG. 1.
Figure 29:
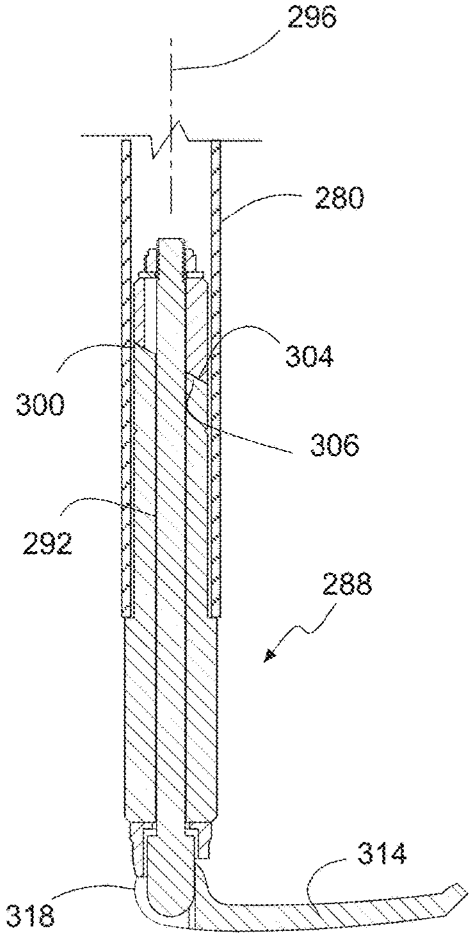
FIG. 29 is a cross-sectional side view of the IV lock of the transport wheelchair of FIG. 1.

Referring to FIGS. 27-29, in some embodiments, the wheelchair 10 can carry an intravenous (IV) pole 280 removably carried by the wheelchair 10, the frame 30 and/or the wheelbase 46. The IV pole 280 can have hooks at a top of the pole to hang bags of medicine or fluid for administration to a patient. In one aspect, the wheelchair 10 can have an IV pole attachment 284 carried by the wheelchair 10, the frame 10 and the wheelbase 46 to receive and carry the IV pole 280. The IV pole attachment 284 can selectively couple the IV pole 280 to the wheelchair 10, the frame 30 and the wheelbase 46. The IV pole attachment 284 can have an IV pole lock 288 associated with IV pole attachment 284. The IV pole lock 288 can be similar to the lock 190 for the armrest 120 (FIGS. 18 and 19), as described herein. The IV pole lock 288 can selectively lock the IV pole 280 to the wheelchair 10, the frame 30 and the wheelbase 46. The IV pole lock 288 can have a plug 292 slidably received in a tube of the IV pole 280. The plug 292 can be carried by the frame 30 or the wheel base 46. The plug 292 can be selectively expanded to grip an interior of the tube of the IV pole 280, and selectively collapsed to release from the interior of the tube.

The plug 292 can have a longitudinal axis 296 that can be oriented vertically. The plug 292 can be bifurcated (indicated at 300) at an inclined angle with respect to the longitudinal axis 296 with opposing inclined surfaces 304 and 306 abutting to one another. A rod 310 can extend through the plug 292 from a distal end of the plug 292 to a proximal end at the frame 30 or the wheel base 46 of the wheelchair 10. A cam lever 314 can be coupled to proximal end of the rod 310. The cam lever 314 can be pivotal to selectively position a cam 318 against the frame 30 or the wheel base 46 to selectively draw and release the rod 310 to selectively displace and release the bifurcated plug 292 laterally.

In one aspect, the IV pole 280 can be pivotally coupled to the wheelchair 10, the frame 30 and the wheelbase 46. The IV pole 280 can have an elbow 320, or a pair of elbows, and can be pivotal about a vertical axis of the IV pole attachment 284 or IV pole lock 288. Thus, the IV pole 280 can be selectively pivoted between 180 degrees to position the top of the IV pole 280 farther and closer to the backrest and the patient. The IV pole attachment 284 can further comprise a brace 322 with an aperture 326 positioned above the plug 292 and vertically aligned with the IV pole lock 288 to receive the tube of the IV pole 280. The brace can be carried by the frame 30 and the wheelbase 46. The IV pole lock 288 can both selectively lock the IV pole 280 to the wheelchair 10, and selectively lock the rotational or pivotal motion of the IV pole 280.

Anti-Tip

Figure 25:
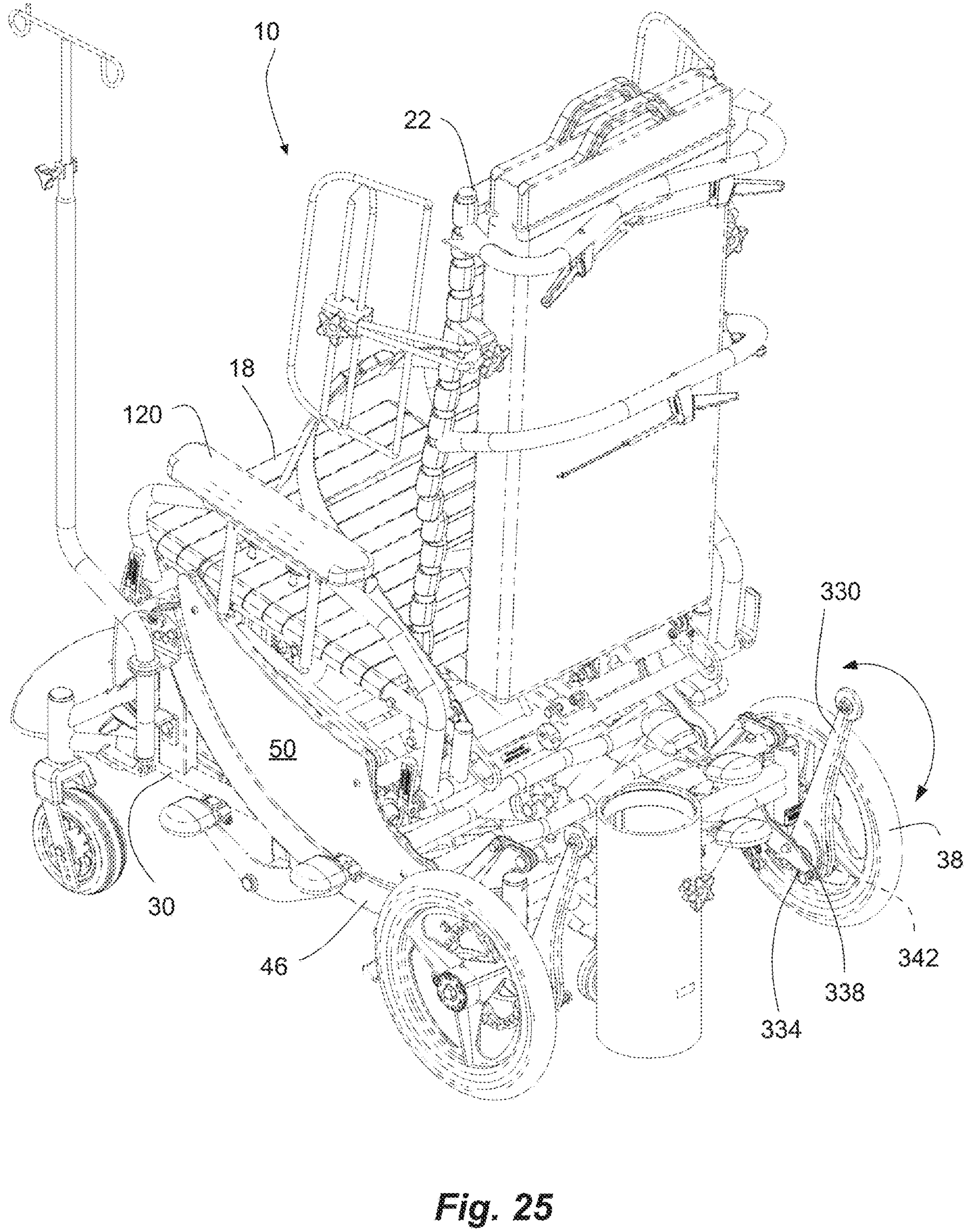
FIG. 25 is a rear perspective view of the transport wheelchair of FIG. 1, shown with the anti-tip bars in a raised orientation in accordance with some embodiments.
Figure 26:
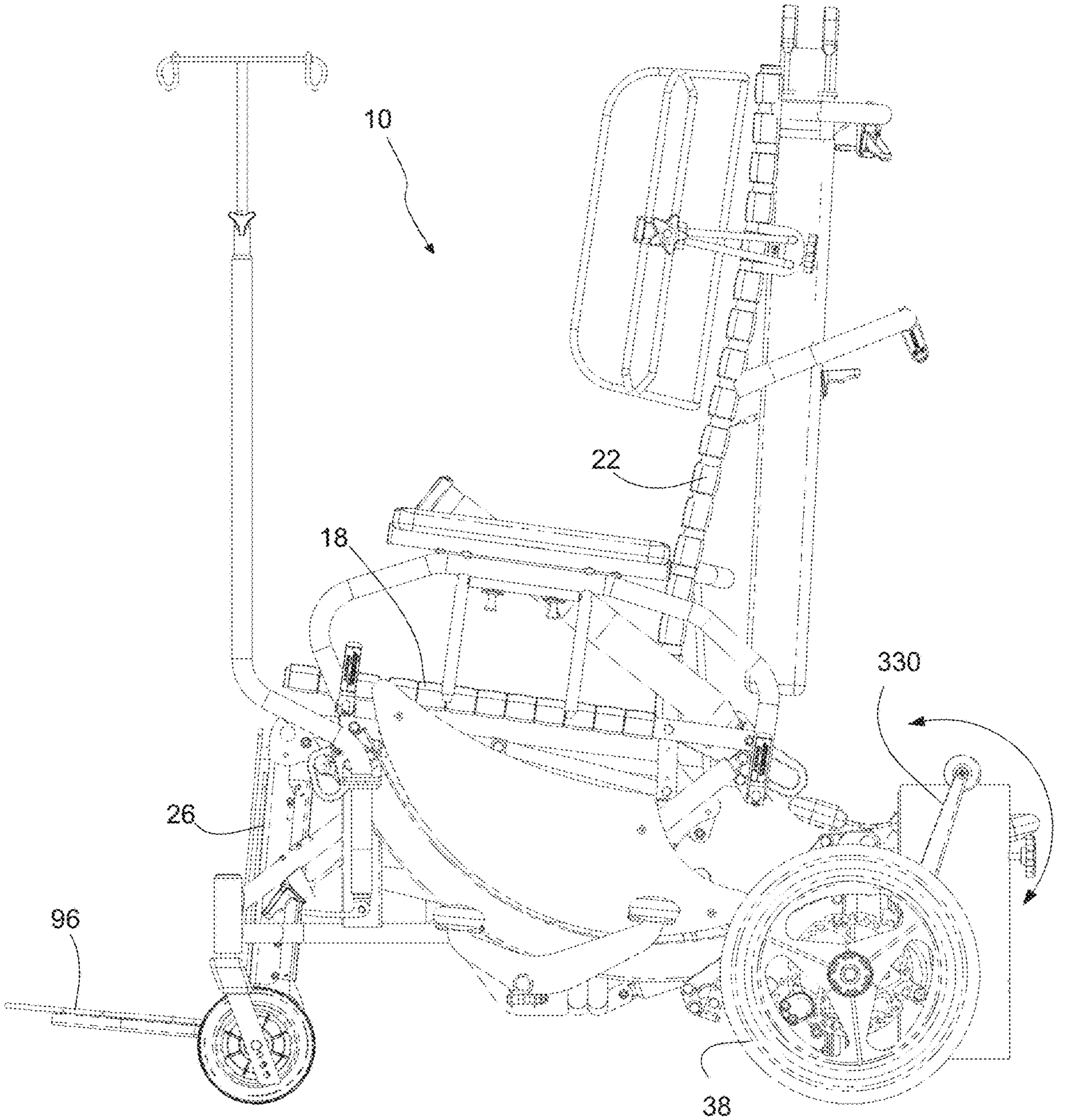
FIG. 26 is a side view of the transport wheelchair of FIG. 1.

Referring to FIGS. 25 and 26, in some embodiments, the wheelchair 10 can have anti-tip bars 330 that can be selectively deployed and retracted. The anti-tip bars 330 can have a deployed or lowered orientation, as shown in FIGS. 1-14, 16 and 17, and a retracted or raised orientation, as shown in FIGS. 25 and 26. The anti-tips bars 330 can be pivotally coupled to a rear of the frame 30 or the wheel base 46. The anti-tip bars 330 can have length to extend beyond a rear of the fixed rear wheels 38 in the deployed or lowered orientation to resist rearward tipping of the wheelchair 10. Each anti-tip bar 330 can have a position lock 334 to selectively lock and release the anti-tip bar 330 in either orientation. The position lock 334 can have a spring-loaded pin 338 coupled to the frame 30 or the wheel base 46 and selectively received in one or more bores 342 in the anti-tip bar 330.

Brake

Referring to FIG. 6, in some embodiments, the wheelchair 10 can have brakes 350 to slow and stop movement of the wheelchair 10. In one aspect, the brakes 350 can include rotors 354 carried by the fixed rear wheels 38, and calipers 358 carried by the frame 30 or the wheel base 46 to selectively pinch the associated rotor 354. One or more brake handles 362 can be positioned on the backrest 22 to be engaged by the operator. The brake handle 362 can be coupled to the caliper 358 by a cable. Squeezing the brake handle 362 can pull the cable and pinch the rotor 354 between the caliber 358.

Wheel Lock

Figure 3:
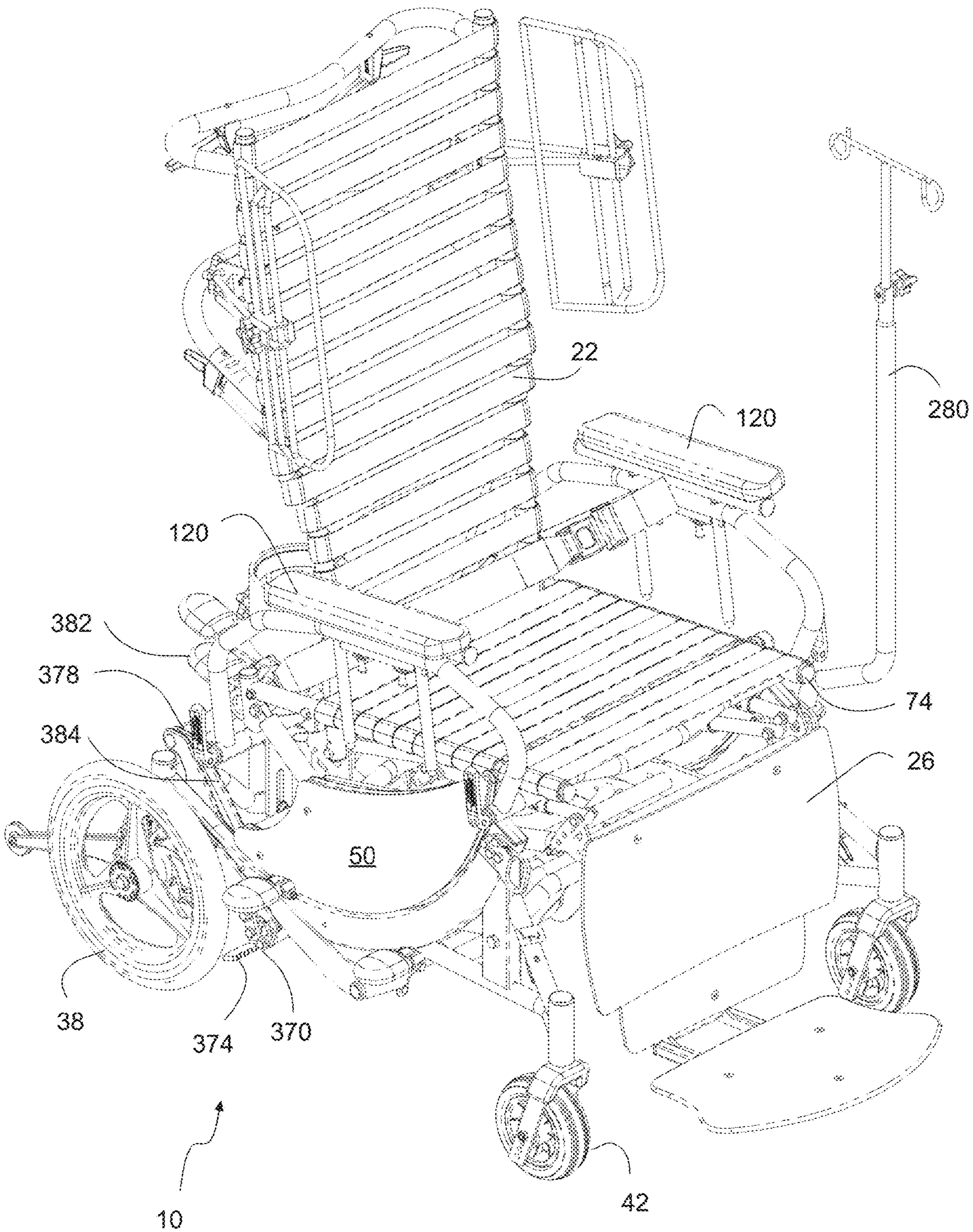
FIG. 3 is a front perspective view of the transport wheelchair of FIG. 1.

Referring to FIG. 3, in some embodiments, the wheelchair 10 can have a wheel lock 370 to engage one or more of the wheels, such as one or more of the fixed rear wheels 38, to resist movement of the wheelchair 10. The wheel lock 370 can include one or more cleats 374 pivotally coupled to the frame 30 or the wheel base 46 and positioned to selectively pivot into engagement with a respective wheel 38. In another aspect, a pair of cleats 374 can be positioned with each on a different lateral side of the frame 30 and with each engaging a different rear wheel 38. In addition, a pivot bar 378 can be pivotally coupled to the frame 30 or the wheel base 46 and can extend laterally across the frame 30 or the wheel base 46. A pedal 382 can be coupled to the pivot bar 378 to selectively pivot the pivot bar 378. Links 384 can extend from the pivot bar 378 to the cleats 374. The pedal 382 can be depressed in one direction to pivot the pivot bar 378, move the link 384, and pivot the cleat 374 into engagement with the wheel 38. The pedal 382 can be depressed in another direction to pivot bar 378, move the link 384, and pivot the cleat 374 out of engagement with the wheel 38.

Method for Patient Transfer and Passenger Transport

A method for transporting a non-emergency medical patient can utilize the non-emergency medical transportation (NEMT) transport wheelchair 10 described herein. The method can comprise removing at least one of the pair of armrests 120 from the transport wheelchair 10. The method can comprise positioning the transport wheelchair 10 proximate the patient. Thus, the wheelchair 10 can be positioned proximate a bed, a chair or other furniture upon which the patient is located. For a patient in a bed, the method can include configuring the transport wheelchair 10 in a reclined configuration with the backrest 22 laid-back with respect to the seat 18, and the legrest 26 raised with respect to the seat 18 so that the backrest 22, the seat 18 and the legrest 26 are substantially horizontal. For a patient in a chair, the method can include configuring the transport wheelchair 10 in a chair configuration with the backrest 22 and the legrest 26 upright with respect to the seat 18. The method can include elevating the seat 18, the backrest 22 and the legrest 26 to an elevation of the patient. Thus, the seat 18 can be at substantially the same elevation as a seat of a chair, or the seat 18, the backrest 22 and the legrest 26 can be at substantially the same elevation as a top of a bed. The method can comprise engaging a first, actuation pedal 134 to actuate a manual actuator 130 associated with the frame 30 to elevate the seat 18, the backrest 22 and the legrest 26 to an elevation of the patient. The method can include transferring the patient to the transport wheelchair 10. The transfer board 240 can be removed from the pouch 244 to assist in transferring the patient, and then returned to the pouch 244. The method can comprise engaging a second, release pedal 146 to release the manual actuator 130 to lower the seat 18, the backrest 22 and the legrest 26 with the patient thereon. The method can comprise configuring the NEMT transport wheelchair 10 in a chair configuration with the patient thereon with the backrest 22 and the legrest 26 upright with respect to the seat 18. The method can comprise replacing the at least one of the pair of armrests 120 on the transport wheelchair 10. The method can include positioning the transport wheelchair 10 with the patient thereon into a vehicle. The method can include securing the transport wheelchair 10 to the vehicle using the rings 54.

In one aspect, the method can include elevating the seat 18, the backrest 22 and the legrest 26 in the reclined configuration at an elevation between substantially 22.5 and 32 inches between the seat 18 and the ground 14.

In another aspect, the method can include elevating the seat 18, the backrest 22 and the legrest 26 in the chair configuration at an elevation between substantially 22.5 and 32 inches between the seat 18 and the ground 14.

In another aspect, the method can include tilting the seat 18, the backrest 22 and the legrest 26 about the front of the seat 18 between a level orientation in which the seat 18 is substantially horizontal and a tilted orientation in which the seat 18 is inclined at an acute angle with respect to horizontal.

In another aspect, the method can include lowering a pivot wheel 160 to elevate the pair of fixed wheels 38 of the set of wheels 34 off of the ground 14. In addition, the method can include moving the transport wheelchair 10 laterally on the pivot wheel 160 while the pair of fixed wheels 38 are elevated. Furthermore, the method can include raising the pivot wheel 160 to elevate the pivot wheel 160 off of the ground 14 to lower the pair of fixed wheels 38 onto the ground 14.

In another aspect, the method can include pivoting a pedal 182 associated with the pivot wheel 160 from a folded orientation to an extended orientation prior to lowering the pivot wheel 160. In addition, the method can include pivoting the pedal 182 from the extended position to the folded orientation after raising the pivot wheel 160.

In another aspect, the method can include pivoting the lateral pedal 134 and/or 146 from a folded orientation to an extended orientation prior to depressing the lateral pedal. In addition, the method can include pivoting the lateral pedal 134 and/or 146 from the extended position to the folded orientation after depressing the lateral pedal.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A transport wheelchair comprising:

a frame comprising a chair base movably carried by a wheel base displaceable on a set of wheels;

a seat, a backrest and a legrest carried by the chair base of the frame;

an intravenous (IV) pole attachment carried by the frame and configured to receive and carry an IV pole;

an IV pole lock associated with IV pole attachment, and comprising:

a plug slidably received in a tube of the IV pole;

the plug having a longitudinal axis;

the plug being bifurcated at an inclined angle with respect to the longitudinal axis with opposing inclined surface abutting to one another;

a rod extending through the plug from a distal end of the plug to a proximal end at the frame; and a cam lever coupled to proximal end of the rod, the cam lever pivotal to selectively position a cam against the frame to selectively draw and release the rod to selectively displace and release the bifurcated plug laterally.

2. The transport wheelchair in accordance with claim 1, further comprising:

an IV pole with an elbow; and the IV pole being pivotal about the IV pole attachment.

3. The transport wheelchair in accordance with claim 1, wherein the transport wheelchair is configured for non-emergency medical transportation (NEMT), and further comprising:

the chair base having at least two elevations, including:

a raised elevation in which the chair base with the seat, the backrest and the legrest are elevated; and a lowered elevation in which the chair base with the seat, the backrest and the legrest are lowered;

a manual actuator coupled between the wheel base and the chair base, and configured to selectively elevate the seat, the backrest and the legrest;

a first actuator pedal operatively coupled to the manual actuator to operate the manual actuator to elevate the chair base with the seat, the backrest and the legrest;

a second release pedal operatively coupled to the manual actuator to lower the chair base with the seat, the backrest and the legrest;

the backrest and the legrest being pivotal with respect to the seat, and the seat, the backrest and the legrest having at least two configurations, including:

a chair configuration in which the backrest and the legrest are upright with respect to the seat; and a reclined configuration in which the backrest is laid-back with respect to the seat, and the legrest is raised with respect to the seat so that the backrest, the seat and the legrest are substantially horizontal;

a pair of armrests removably coupled with respect to the seat and each having an attached position on a lateral side of the seat and a removed position away from the seat;

securement points carried by the frame and configured to be engaged by fasteners to secure the wheelchair in a vehicle; and the wheelchair having at least three configurations, including:

a patient acquisition configuration in which at least one of the pair of armrests is in the removed position; the seat, the backrest and the legrest are in the reclined configuration; and the chair base with the seat, the backrest and the legrest are in the raised elevation, configured to transfer a patient to the wheelchair;

a patient transport configuration in which the pair of armrests is in the attached position; the seat, the backrest and the legrest are in the chair configuration; and the chair base with the seat, the backrest and the legrest are in the lowered elevation, configured to transport the patient with the wheelchair; and a patient passenger configuration in which the wheelchair with the patient thereon is positioned in a motor vehicle; the securement points of the wheelchair are coupled to the motor vehicle; the pair of armrests is in the attached position; and the chair base with the seat, the backrest and the legrest are in the lowered elevation, configured to transport the patient with the motor vehicle with the patient in the wheelchair.

4. The transport wheelchair in accordance with claim 3, further comprising:

a front of the chair base being pivotally coupled to the wheel base, and the chair base with the seat, the backrest and the legrest being pivotal between at least two orientations, including:

a level orientation in which the seat is substantially horizontal; and a tilted orientation in which the seat is inclined at an acute angle with respect to horizontal; and wherein the chair base is in the level orientation when the wheelchair is in the patient acquisition configuration.

5. The transport wheelchair in accordance with claim 3, further comprising:

the first actuator pedal and the second release pedal being coupled to the frame and positioned at a lateral side of the frame.

6. The transport wheelchair in accordance with claim 3, further comprising:

the first actuator pedal and the second release pedal being pivotal between a folded orientation and an extended orientation.

7. The transport wheelchair in accordance with claim 3, wherein the first actuator pedal comprises a pair of first actuator pedals each disposed on a different lateral side of the frame; and further comprising a connector spanning the frame between the pair of first actuator pedals with an intermediate portion of the connector engaging the manual actuator.

8. The transport wheelchair in accordance with claim 3, further comprising:

a rocker bar operatively coupled to the manual actuator to operate the manual actuator;

the rocker bar being coupled to the frame and positioned at a lateral side of the frame; and the first actuator pedal and the second located at opposite ends of the rocker bar.

9. The transport wheelchair in accordance with claim 8, wherein the rocker bar comprises a pair of rocker bars each disposed on a different lateral side of the frame; and further comprising a connector spanning the frame between the pair of rocker bars with an intermediate portion of the connector engaging the actuator.

10. The transport wheelchair in accordance with claim 1, further comprising:

the set of wheels comprising a pair of fixed wheels configured to rotate around a laterally-oriented rotational axis;

a pivot wheel coupled to the frame and oriented perpendicular to the pair of fixed wheels and configured to rotate around a longitudinally-oriented rotational axis; and the pivot wheel being selectively positionable between:

an elevated position higher than a bottom of the pair of fixed wheels and off of the ground; and a lowered position lower than the bottom of the pair of fixed wheels with the pair of fixed wheels elevated off of the ground and the pivot wheel configured to roll laterally.

11. The transport wheelchair in accordance with claim 10, further comprising:

a linkage coupled to and between the pivot wheel and the frame, the linkage having a collapsed configuration corresponding to the elevated position of the pivot wheel, and an extended configuration corresponding to the lowered position of the pivot wheel; and a pedal coupled to the linkage an operable to transition the linkage from the collapsed configuration to the extended configuration.

12. The transport wheelchair in accordance with claim 11, further comprising:

the pedal being pivotally coupled to the linkage and pivotal between a folded orientation and an extended orientation; and the pedal having a lobe positioned to abut the linkage in the extended orientation and positioned away from the linkage in the folded orientation.

13. The transport wheelchair in accordance with claim 11, further comprising:

a gas spring coupled to and between the frame and the linkage and configured to hold the linkage and selectively release the linkage.

14. The transport wheelchair in accordance with claim 11, further comprising:

the pivot wheel comprising a pair of pivot wheels aligned laterally and forming a pair of spaced-apart points of contact with the ground in the lowered position.

15. The transport wheelchair in accordance with claim 1, further comprising:

a pair of armrests removably coupled with respect to the seat and each having an attached position on a lateral side of the seat and a removed position away from the seat;

each of the armrests having a lock to selectively lock and release the armrest with respect to the seat, the lock comprising:

a tube associated with the frame or the seat;

a plug slidably received in the tube;

the plug having a longitudinal axis;

the plug being bifurcated at an inclined angle with respect to the longitudinal axis with opposing inclined surfaces abutting to one another;

a rod extending through the plug from a distal end of the plug to a proximal end at the armrest; and a cam lever coupled to the proximal end of the rod, the cam lever being pivotal to selectively position a cam against the armrest to selectively draw and release the rod to selectively displace and release the bifurcated plug laterally.

16. A transport wheelchair comprising:

a frame comprising a chair base movably carried by a wheel base displaceable on a set of wheels;

a seat, a backrest and a legrest carried by the chair base of the frame;

an intravenous (IV) pole removably carried by the frame;

the IV pole being pivotally coupled to the frame;

an IV pole attachment to receive the IV pole and selectively couple the IV pole to the frame;

a brace associated with IV pole attachment, the brace having an aperture to receive a tube of the IV pole;

an IV pole lock associated with IV pole attachment and vertically aligned with the aperture of the brace, the IV pole lock comprising:

a plug carried by the frame and slidably received in the tube of the IV pole;

the plug having a longitudinal axis;

the plug being bifurcated at an inclined angle with respect to the longitudinal axis with opposing inclined surface abutting to one another;

a rod extending through the plug from a distal end of the plug to a proximal end at the frame; and a cam lever coupled to proximal end of the rod, the cam lever pivotal to selectively position a cam against the frame to selectively draw and release the rod to selectively displace and release the bifurcated plug laterally.

17. The transport wheelchair in accordance with claim 16, wherein the transport wheelchair is configured for non-emergency medical transportation (NEMT), and further comprising:

the chair base having at least two elevations, including:

a raised elevation in which the chair base with the seat, the backrest and the legrest are elevated; and a lowered elevation in which the chair base with the seat, the backrest and the legrest are lowered;

a manual actuator coupled between the wheel base and the chair base, and configured to selectively elevate the seat, the backrest and the legrest;

a first actuator pedal operatively coupled to the manual actuator to operate the manual actuator to elevate the chair base with the seat, the backrest and the legrest;

a second release pedal operatively coupled to the manual actuator to lower the chair base with the seat, the backrest and the legrest;

the backrest and the legrest being pivotal with respect to the seat, and the seat, the backrest and the legrest having at least two configurations, including:

a chair configuration in which the backrest and the legrest are upright with respect to the seat; and a reclined configuration in which the backrest is laid-back with respect to the seat, and the legrest is raised with respect to the seat so that the backrest, the seat and the legrest are substantially horizontal;

a pair of armrests removably coupled with respect to the seat and each having an attached position on a lateral side of the seat and a removed position away from the seat;

securement points carried by the frame and configured to be engaged by fasteners to secure the wheelchair in a vehicle; and the wheelchair having at least three configurations, including:

a patient acquisition configuration in which at least one of the pair of armrests is in the removed position; the seat, the backrest and the legrest are in the reclined configuration; and the chair base with the seat, the backrest and the legrest are in the raised elevation, configured to transfer a patient to the wheelchair;

a patient transport configuration in which the pair of armrests is in the attached position; the seat, the backrest and the legrest are in the chair configuration; and the chair base with the seat, the backrest and the legrest are in the lowered elevation, configured to transport the patient with the wheelchair; and a patient passenger configuration in which the wheelchair with the patient thereon is positioned in a motor vehicle; the securement points of the wheelchair are coupled to the motor vehicle; the pair of armrests is in the attached position; and the chair base with the seat, the backrest and the legrest are in the lowered elevation, configured to transport the patient with the motor vehicle with the patient in the wheelchair.

18. A transport wheelchair comprising:

a frame comprising a chair base movably carried by a wheel base displaceable on a set of wheels;

a seat, a backrest and a legrest carried by the chair base of the frame;

an intravenous (IV) pole attachment carried by the frame and configured to receive and carry an IV pole;

an IV pole lock associated with IV pole attachment, and comprising:

a plug slidably received in a tube of the IV pole;

the plug having a longitudinal axis;

the plug being bifurcated at an inclined angle with respect to the longitudinal axis with opposing inclined surface abutting to one another;

a rod extending through the plug from a distal end of the plug to a proximal end at the frame; and a cam lever coupled to proximal end of the rod, the cam lever pivotal to selectively position a cam against the frame to selectively draw and release the rod to selectively displace and release the bifurcated plug laterally; and a pair of armrests removably coupled with respect to the seat and each having an attached position on a lateral side of the seat and a removed position away from the seat;

each of the armrests having a lock to selectively lock and release the armrest with respect to the seat, the lock comprising:

a tube associated with the frame or the seat;

a plug slidably received in the tube;

the plug having a longitudinal axis;

the plug being bifurcated at an inclined angle with respect to the longitudinal axis with opposing inclined surfaces abutting to one another;

a rod extending through the plug from a distal end of the plug to a proximal end at the armrest; and a cam lever coupled to the proximal end of the rod, the cam lever being pivotal to selectively position a cam against the armrest to selectively draw and release the rod to selectively displace and release the bifurcated plug laterally.

19. The transport wheelchair in accordance with claim 18, further comprising:

a brace carried by the frame and having an aperture positioned above the plug and configured to receive the tube of the IV pole.

20. The transport wheelchair in accordance with claim 18, wherein the transport wheelchair is configured for non-emergency medical transportation (NEMT), and further comprising:

the chair base having at least two elevations, including:

a raised elevation in which the chair base with the seat, the backrest and the legrest are elevated; and a lowered elevation in which the chair base with the seat, the backrest and the legrest are lowered;

a manual actuator coupled between the wheel base and the chair base, and configured to selectively elevate the seat, the backrest and the legrest;

a first actuator pedal operatively coupled to the manual actuator to operate the manual actuator to elevate the chair base with the seat, the backrest and the legrest;

a second release pedal operatively coupled to the manual actuator to lower the chair base with the seat, the backrest and the legrest;

the backrest and the legrest being pivotal with respect to the seat, and the seat, the backrest and the legrest having at least two configurations, including:

a chair configuration in which the backrest and the legrest are upright with respect to the seat; and a reclined configuration in which the backrest is laid-back with respect to the seat, and the legrest is raised with respect to the seat so that the backrest, the seat and the legrest are substantially horizontal;

a pair of armrests removably coupled with respect to the seat and each having an attached position on a lateral side of the seat and a removed position away from the seat;

securement points carried by the frame and configured to be engaged by fasteners to secure the wheelchair in a vehicle; and the wheelchair having at least three configurations, including:

a patient acquisition configuration in which at least one of the pair of armrests is in the removed position; the seat, the backrest and the legrest are in the reclined configuration; and the chair base with the seat, the backrest and the legrest are in the raised elevation, configured to transfer a patient to the wheelchair;

a patient transport configuration in which the pair of armrests is in the attached position; the seat, the backrest and the legrest are in the chair configuration; and the chair base with the seat, the backrest and the legrest are in the lowered elevation, configured to transport the patient with the wheelchair; and a patient passenger configuration in which the wheelchair with the patient thereon is positioned in a motor vehicle; the securement points of the wheelchair are coupled to the motor vehicle; the pair of armrests is in the attached position; and the chair base with the seat, the backrest and the legrest are in the lowered elevation, configured to transport the patient with the motor vehicle with the patient in the wheelchair.

* * * * *